United States Patent
Kim et al.

(10) Patent No.: US 11,202,298 B2
(45) Date of Patent: Dec. 14, 2021

(54) RESOLVING DECODABILITY FOR SUBSEQUENT TRANSMISSIONS WHOSE THROUGHPUT EXCEEDS A THRESHOLD

(71) Applicant: QUALCOMM Incorporated, San Diego, CA (US)

(72) Inventors: Hobin Kim, San Diego, CA (US); Gabi Sarkis, San Diego, CA (US); Hari Sankar, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 16/595,834

(22) Filed: Oct. 8, 2019

(65) Prior Publication Data

US 2020/0112965 A1 Apr. 9, 2020

Related U.S. Application Data

(60) Provisional application No. 62/743,524, filed on Oct. 9, 2018.

(51) Int. Cl.
*H04W 72/08* (2009.01)
*H04W 72/04* (2009.01)
(Continued)

(52) U.S. Cl.
CPC ........ *H04W 72/085* (2013.01); *H04B 7/0619* (2013.01); *H04L 5/0007* (2013.01); *H04L 49/90* (2013.01); *H04W 72/044* (2013.01)

(58) Field of Classification Search
None
See application file for complete search history.

(56) References Cited

U.S. PATENT DOCUMENTS 8,537,750 B2   9/2013  Jin et al.
2014/0053049 A1*  2/2014  Chen .................... H04L 1/0066
                                                                714/807

(Continued)

FOREIGN PATENT DOCUMENTS

WO    WO2013115690 A1    8/2013

OTHER PUBLICATIONS

International Search Report and Written Opinion—PCT/US2019/055329—ISA/EPO—dated Jan. 14, 2020.

(Continued)

*Primary Examiner* — Christine T Duong
(74) *Attorney, Agent, or Firm* — Holland & Hart LLP

(57) ABSTRACT

Methods, systems, and devices for wireless communications are described. A user equipment (UE) may determine to decode or refrain from decoding a transport block (TB) transmitted from a base station based on a decodability condition. The decodability condition may include whether an effective UE throughput for decoding the TB is greater than a predetermined decoding throughput threshold or not. If the effective UE throughput is greater than the predetermined decoding throughput threshold, the UE may refrain from decoding the TB. In some cases, the TB may be a subsequent transmission from the base station based on an initial transmission not being correctly decoded, and the UE may refrain from decoding the subsequent transmission.

27 Claims, 10 Drawing Sheets

(51) Int. Cl.
    *H04L 12/861*     (2013.01)
    *H04B 7/06*       (2006.01)
    *H04L 5/00*       (2006.01)

(56) References Cited

U.S. PATENT DOCUMENTS

| | | |
|---|---|---|
| 2014/0101498 A1 | 4/2014 | Xiong et al. |
| 2015/0358113 A1* | 12/2015 | Callard ............... H04L 1/0041 714/776 |
| 2018/0241499 A1 | 8/2018 | Einhaus et al. |
| 2018/0270880 A1 | 9/2018 | Hosseini et al. |
| 2021/0036799 A1* | 2/2021 | Weng ............... H04W 28/0257 |

OTHER PUBLICATIONS

Qualcomm Incorporated: "Maintenance for DL/UL Data Scheduling and HARQ Procedure", 3GPP TSG RAN WG1 Meeting #94bis, 3GPP Draft; R1-1811236 Sched-HARQ-Maintenance, 3rd Generation Partnership Project (3GPP), Mobile Competence Centre, 650, Route Des Lucioles ; F-06921 Sophia-Antipolis Cedex, France, vol. RAN WG1, No. Chengdu, CN; Oct. 8, 2018-Oct. 12, 2018, Sep. 29, 2018 (Sep. 29, 2018), 16 Pages, XP051518637, Retrieved from the Internet: URL: http://www.3gpp.org/ftp/tsg%5Fran/WG1%5FRL1/ TSGR1%5F94b/Docs/R1%2D1811236%2Ezip [retrieved on Sep. 29, 2018], Paragraph [0004].

\* cited by examiner

RESOLVING DECODABILITY FOR SUBSEQUENT TRANSMISSIONS WHOSE THROUGHPUT EXCEEDS A THRESHOLD

CROSS REFERENCE

The present Application for Patent claims the benefit of U.S. Provisional Patent Application No. 62/743,524 by KIM, et al., entitled "RESOLVING DECODABILITY FOR RETRANSMISSIONS WHOSE THROUGHPUT EXCEEDS A THRESHOLD," filed Oct. 9, 2018, assigned to the assignee hereof, and expressly incorporated by reference herein.

BACKGROUND

The following relates generally to wireless communications, and more specifically to resolving decodability for subsequent transmissions whose throughput exceeds a threshold.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may decode one or more transport blocks (TBs) from a base station to receive downlink information. Accordingly, the UE may sustain a peak decoding throughput based on a maximum TB size when decoding the one or more TBs. However, a decoding throughput may exceed the peak decoding throughput in certain situations. For example, the decoding throughput for a subsequent transmission of one or more TBs may exceed the peak throughput since the base station may transmit subsequent TBs at a lower code rate than initial TB transmissions. The lower code rate may result in the UE needing more time to decode the subsequent transmissions based on decoding a same amount of codeblocks at the lower rate, thereby increasing the decoding throughput. As such, decoding hardware within the UE may become overprovisioned based on attempting to decode subsequent transmissions where the decoding throughput exceeds the peak decoding throughput. Efficient techniques are desired for handling the excessive decoding throughputs.

SUMMARY

The described techniques relate to improved methods, systems, devices, and apparatuses that support resolving decodability for subsequent transmissions whose throughput exceeds a threshold. Generally, the described techniques provide for a user equipment (UE) receiving a transport block (TB) from a base station and attempting to decode the TB. In some cases, the UE may be unable to decode the TB, and the base station may retransmit the TB based on a feedback message from the UE indicating the unsuccessful decoding. The UE may then determine whether or not to process this subsequent transmission (or the TB) based on whether an effective throughput for the UE exceeds a predetermined decoding throughput threshold. Subsequently, the UE may decode the subsequent transmission (or the TB) if the effective throughput for the UE is less than the predetermined decoding throughput threshold or refrain from decoding the subsequent transmission if the effective throughput for the UE exceeds the predetermined decoding throughput threshold.

The predetermined decoding throughput threshold may be based on a throughput for decoding a TB of a maximum TB size transmitted in a fourteen-symbol duration, a number of codeblocks for transmitting a TB of a maximum TB size, a length of a codeblock-level cyclic redundancy check (CRC), a length of a TB-level CRC, a coding rate for transmitting a TB of maximum TB size with limited-buffer rate-matching (LBRM) enabled, a scaling factor, or any combination thereof. Additionally, the effective throughput of the subsequent transmission for the UE may be based on a sub-carrier spacing (SCS) for the subsequent transmission, a minimum SCS configured for a component carrier, a number of transmitted codeblocks in the TB, a circular buffer size, a physical downlink shared channel (PDSCH) duration for the subsequent transmission, a set of TBs scheduled in a fourteen-consecutive-symbol duration, or any combination thereof.

A method of wireless communication at a UE is described. The method may include receiving, from a base station, a transmission including a TB, attempting to decode the transmission, transmitting a feedback message to the base station indicating that at least a portion of the transmission including the TB was unsuccessfully decoded, receiving, from the base station, one or more subsequent transmissions of at least the TB, determining an effective UE throughput of the one or more subsequent transmissions of at least the TB based on scaling an initial UE throughput based on a function which is dependent at least upon a duration of a physical downlink shared channel for the TB and a number of orthogonal frequency division multiplexing (OFDM) symbols of the one or more subsequent transmissions of at least the TB, and processing a subsequent transmission of the one or more subsequent transmissions based on whether the effective UE throughput of the one or more subsequent transmissions exceeds a predetermined decoding throughput threshold.

An apparatus for wireless communication at a UE is described. The apparatus may include a processor, memory coupled with the processor, and instructions stored in the memory. The instructions may be executable by the processor to cause the apparatus to receive, from a base station, a transmission including a TB, attempt to decode the transmission, transmit a feedback message to the base station indicating that at least a portion of the transmission including the TB was unsuccessfully decoded, receive, from the base station, one or more subsequent transmissions of at least the TB, determine an effective UE throughput of the one or more subsequent transmissions of at least the TB based on scaling an initial UE throughput based on a function which is dependent at least upon a duration of a physical downlink shared channel for the TB and a number of OFDM symbols of the one or more subsequent transmissions of at least the TB, and process a subsequent transmission of the one or more subsequent transmissions based on whether the effective UE throughput of the one or more subsequent transmissions exceeds a predetermined decoding throughput threshold.

Another apparatus for wireless communication at a UE is described. The apparatus may include means for receiving, from a base station, a transmission including a TB, attempting to decode the transmission, transmitting a feedback message to the base station indicating that at least a portion of the transmission including the TB was unsuccessfully decoded, receiving, from the base station, one or more subsequent transmissions of at least the TB, determining an effective UE throughput of the one or more subsequent transmissions of at least the TB based on scaling an initial UE throughput based on a function which is dependent at least upon a duration of a physical downlink shared channel for the TB and a number of OFDM symbols of the one or more subsequent transmissions of at least the TB, and processing a subsequent transmission of the one or more subsequent transmissions based on whether the effective UE throughput of the one or more subsequent transmissions exceeds a predetermined decoding throughput threshold.

A non-transitory computer-readable medium storing code for wireless communication at a UE is described. The code may include instructions executable by a processor to receive, from a base station, a transmission including a TB, attempt to decode the transmission, transmit a feedback message to the base station indicating that at least a portion of the transmission including the TB was unsuccessfully decoded, receive, from the base station, one or more subsequent transmissions of at least the TB, determine an effective UE throughput of the one or more subsequent transmissions of at least the TB based on scaling an initial UE throughput based on a function which is dependent at least upon a duration of a physical downlink shared channel for the TB and a number of OFDM symbols of the one or more subsequent transmissions of at least the TB, and process a subsequent transmission of the one or more subsequent transmissions based on whether the effective UE throughput of the one or more subsequent transmissions exceeds a predetermined decoding throughput threshold.

In some examples of the method, apparatuses, and non-transitory computer-readable medium described herein, processing the subsequent transmission of the one or more subsequent transmissions may further include operations, features, means, or instructions for decoding the subsequent transmission based on the effective UE throughput of the one or more subsequent transmissions being less than the predetermined decoding throughput threshold.

In some examples of the method, apparatuses, and non-transitory computer-readable medium described herein, processing the subsequent transmission of the one or more subsequent transmissions may further include operations, features, means, or instructions for refraining from decoding the subsequent transmission based on the effective UE throughput of the one or more subsequent transmissions exceeding the predetermined decoding throughput threshold.

In some examples of the method, apparatuses, and non-transitory computer-readable medium described herein, processing the subsequent transmission of the one or more subsequent transmissions may further include operations, features, means, or instructions for refraining from decoding any of the one or more subsequent transmissions based on the effective UE throughput of the one or more subsequent transmissions exceeding the predetermined decoding throughput threshold.

In some examples of the method, apparatuses, and non-transitory computer-readable medium described herein, processing the subsequent transmission of the one or more subsequent transmissions may further include operations, features, means, or instructions for refraining from decoding the TB of the one or more subsequent transmissions based on the effective UE throughput of the one or more subsequent transmissions exceeding the predetermined decoding throughput threshold.

In some examples of the method, apparatuses, and non-transitory computer-readable medium described herein, the predetermined decoding throughput threshold ($TP_{max}$) may be defined as $$TP_{max} = \frac{1}{R_{LBRM}} TBS_{LBRM},$$

where $TBS_{LBRM}$ is a maximum TB size with limited buffer rate matching (LBRM) enabled, and where $R_{LBRM}$ is a coding rate when transmitting a TB of the maximum TB size with LBRM enabled.

In some examples of the method, apparatuses, and non-transitory computer-readable medium described herein, the effective UE throughput of the subsequent transmission may be defined as $$2^{max(0,\mu-\mu')} \cdot \sum_{i \in S} \left\lfloor \frac{C_i'}{L_i} \right\rfloor \cdot x_i F_i,$$

where $\mu$ relates to a sub-carrier spacing (SCS) for the one or more subsequent transmissions for an active bandwidth part, $\mu'$ corresponds to an SCS of a bandwidth part across all configured bandwidth parts of a carrier that has a largest configured number of physical resource blocks, $C_i'$ is a number of scheduled codeblocks for an $i^{th}$ TB, $L_i$ is a PDSCH duration for the $i^{th}$ TB, S is a set of TBs scheduled partially or fully in a consecutive-symbol duration for the $i^{th}$ TB, $x_i$ is a number of OFDM symbols of the one or more subsequent transmissions of the $i^{th}$ TB, $F_i$ is a number of coded bits in a codeblock and is a maximum value of a $min(k_{0,i}^j+E_i^j, N_{cb,i})$, where $k_{0,i}^j$ is a starting location of a redundancy value for a $j^{th}$ transmission, $E_i^j$ is a $min(E_r)$ of scheduled code blocks for the $j^{th}$ transmission, $N_{cb,i}$ is a circular buffer length, where j ranges from 0 to J−1, where J−1 is a current subsequent transmission for the $$i^{th}TB, \left\lfloor \frac{C_i'}{L_i} \right\rfloor$$

is a floor function for the input of $$\frac{C_i'}{L_i} \text{ and } 2^{max(0,\mu-\mu')} \cdot \sum_{i \in S} \left\lfloor \frac{C_i'}{L_i} \right\rfloor \cdot F_i$$

represents the initial UE throughput.

In some examples of the method, apparatuses, and non-transitory computer-readable medium described herein, the effective UE throughput of the subsequent transmission may be evaluated for an interval ending at an end of a last symbol of a latest PDSCH transmission.

In some examples of the method, apparatuses, and non-transitory computer-readable medium described herein, the subsequent transmission of the one or more subsequent transmissions may be a last-received subsequent transmission.

In some examples of the method, apparatuses, and non-transitory computer-readable medium described herein, the predetermined decoding throughput threshold may be based on a throughput for decoding a TB of a maximum TB size transmitted in a fourteen-symbol duration.

In some examples of the method, apparatuses, and non-transitory computer-readable medium described herein, the predetermined decoding throughput threshold may be based on a maximum TB size, a number of codeblocks for transmitting a TB of the maximum TB size, a length of a codeblock-level CRC, a length of a transport-level CRC, a coding rate for transmitting a TB of the maximum TB size with LBRM enabled, and a scaling factor.

In some examples of the method, apparatuses, and non-transitory computer-readable medium described herein, the scaling factor may be one.

In some examples of the method, apparatuses, and non-transitory computer-readable medium described herein, the scaling factor may be greater than one.

In some examples of the method, apparatuses, and non-transitory computer-readable medium described herein, the effective UE throughput of the one or more subsequent transmissions may be based on a number of transmitted codeblocks in the TB, a circular buffer size, and a PDSCH duration for the one or more subsequent transmissions.

In some examples of the method, apparatuses, and non-transitory computer-readable medium described herein, the effective UE throughput of the subsequent transmission may be applicable for a subsequent transmission whose PDSCH duration is greater than a mini-slot duration but may be not applicable for subsequent transmissions involving different sub-carrier spacing values or back-to-back subsequent transmissions whose PDSCH durations is of a mini-slot.

In some examples of the method, apparatuses, and non-transitory computer-readable medium described herein, the effective UE throughput of the one or more subsequent transmissions may be further based on an SCS of the subsequent transmission and a minimum SCS of a component carrier carrying the one or more subsequent transmissions.

In some examples of the method, apparatuses, and non-transitory computer-readable medium described herein, the effective UE throughput of the subsequent transmission may be applicable for a subsequent transmission whose PDSCH duration is greater than a mini-slot duration and may be applicable for a subsequent transmission involving different SCS values than the transmission including the TB.

In some examples of the method, apparatuses, and non-transitory computer-readable medium described herein, the effective UE throughput of the one or more subsequent transmissions may be further based on a sum of UE throughputs for multiple TBs in the one or more subsequent transmissions.

In some examples of the method, apparatuses, and non-transitory computer-readable medium described herein, the effective UE throughput of the one or more subsequent transmissions may be applicable for subsequent transmissions that are not using a redundancy version zero, where the redundancy version zero indicates the subsequent transmissions begin at a bit zero of an encoded information message.

In some examples of the method, apparatuses, and non-transitory computer-readable medium described herein, the effective UE throughput of the one or more subsequent transmissions may be applicable regardless of a redundancy version used by the one or more subsequent transmissions, where the redundancy version indicates a location in an encoded information message where the one or more subsequent transmissions begin.

In some examples of the method, apparatuses, and non-transitory computer-readable medium described herein, processing the subsequent transmission of the one or more subsequent transmissions may include operations, features, means, or instructions for determining whether the UE is required to decode the subsequent transmission of the one or more subsequent transmissions.

Some examples of the method, apparatuses, and non-transitory computer-readable medium described herein may further include operations, features, means, or instructions for determining whether the UE is required to decode the subsequent transmission of the one or more subsequent transmissions is based on whether an effective UE throughput of at least the one or more subsequent transmissions exceeds the predetermined decoding throughput threshold.

DETAILED DESCRIPTION

Figure 1:
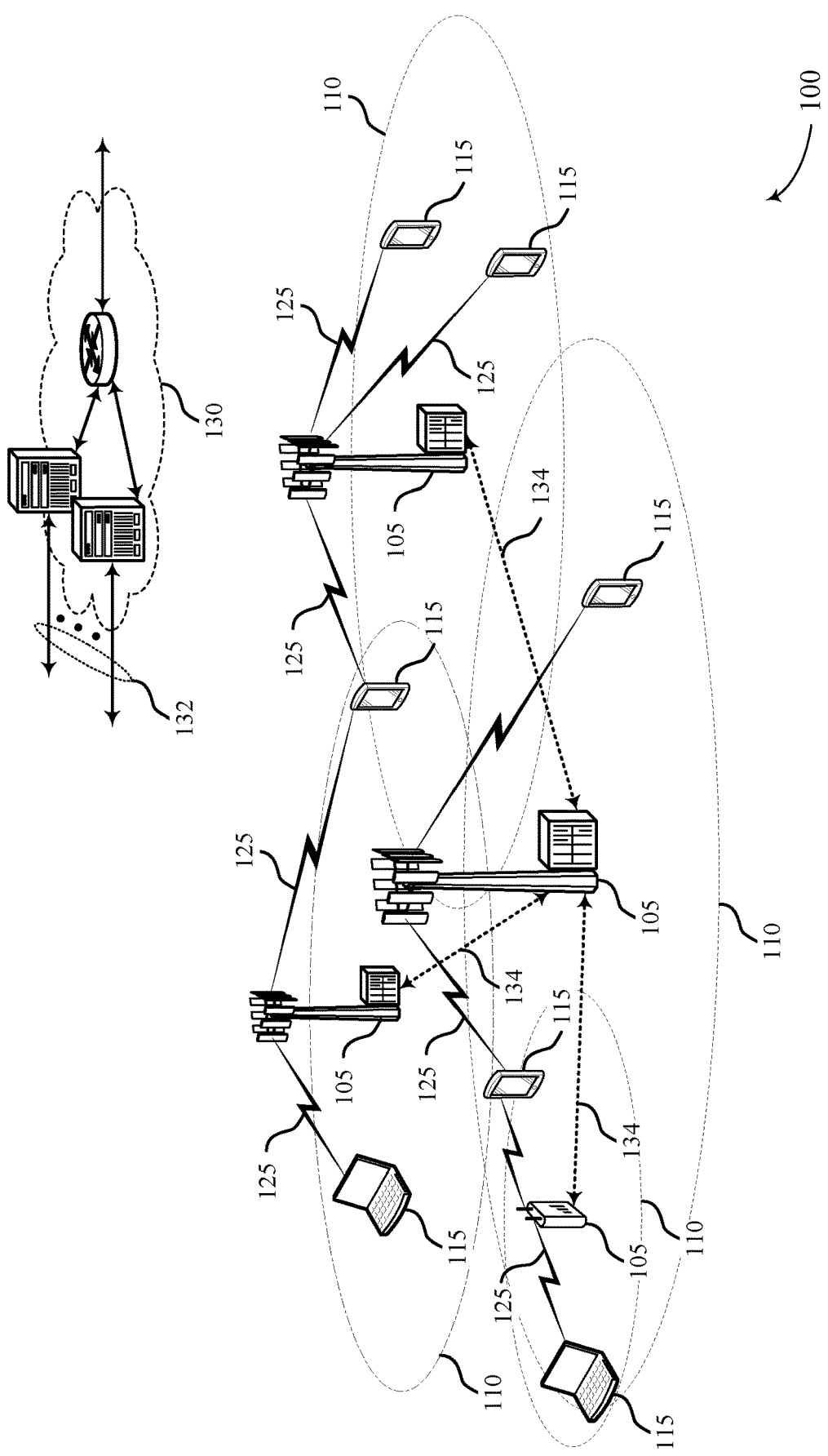
FIG. 1 illustrates an example of a system for wireless communications that supports resolving decodability for subsequent transmissions whose throughput exceeds a threshold in accordance with aspects of the present disclosure.

Some wireless communications systems may support the use of error correcting codes for introducing redundancy in a codeword so that transmission errors may be detected and corrected. These error correcting codes may generally compensate for the intrinsic unreliability of information transfer over the air interface. Low-density parity-check (LDPC) codes are one type of error correcting codes which may be used to increase the robustness of a transmission. In addition to using error correcting codes, a wireless device may also support subsequent transmissions of a codeword to increase the likelihood that the codeword is received successfully. Each of the multiple transmissions (e.g., and subsequent transmissions) may include some portion of systematic bits (e.g., generated by a kernel of an encoder) and parity bits of the codeword, such that the decoder can use incremental redundancy (IR) to combine the codeword bits received in the multiple transmissions.

A user equipment (UE) may be designed to sustain a peak decoding throughput based on a maximum transport block (TB) size (TBS) when decoding a received codeword in a corresponding TB. The maximum TBS may be based on a largest TBS transmitted in a physical downlink shared channel (PDSCH) within a slot (e.g., fourteen symbols). In some cases, however, a decoding throughput may exceed the peak decoding throughput. For example, a transmission or subsequent transmission of a TB at or near a peak data rate (e.g., associated with the peak decoding throughput) in a higher subcarrier spacing (SCS) with multiple numerologies (e.g., SCSs) configured across different bandwidth parts (BWPs) of a downlink may result in a decoding throughput higher than the peak decoding throughput. Additionally or alternatively, a TB transmitted with a PDSCH duration significantly shorter than a slot duration (e.g., a mini-slot) or a TB subsequent transmission occurring on a significantly shorter PDSCH duration than the initial TB transmission may result in a higher decoding throughput than the peak decoding throughput. Accordingly, if the UE attempts to decode a codeword that corresponds to a higher decoding throughput than the peak decoding throughput, decoding hardware within the UE may need to be overprovisioned.

To handle the high decoding throughputs, the UE may process one or more subsequent TB transmissions utilizing a decodability criterion or metric. According to the decodability criterion or metric, the UE may refrain from decoding one or more TB subsequent transmissions (or the TB) when one or more TB subsequent transmissions would require a decoding throughput exceeding a predetermined decoding throughput threshold. The predetermined decoding throughput threshold may be based on a maximum TBS, a throughput required to decode a TB of the maximum TBS transmitted in a fourteen-symbol duration, a number of codeblocks for transmitting a TB of the maximum TB size, a length of a codeblock-level cyclic redundancy check (CRC), a length of a TB-level CRC, a coding rate for transmitting a TB of maximum TB size with limited-buffer rate-matching (LBRM) enabled, a scaling factor, or a combination thereof. Additionally, the decoding throughput may be based on an SCS for the one or more subsequent transmissions, a minimum SCS configured for a component carrier (CC), a number of transmitted codeblocks in the TB, a circular buffer size, a PDSCH duration for the one or more subsequent transmissions, a set of TBs scheduled in a fourteen-consecutive-symbol duration, a PDSCH duration for an $i^{th}$ TB, a number of orthogonal frequency division multiplexing (OFDM) symbols of one or more retransmissions of an $i^{th}$ TB, or any combination thereof. Accordingly, the UE may decode one or more of the subsequent transmissions if the decoding throughput is less than the predetermined decoding throughput threshold or may refrain from decoding the subsequent transmission if the decoding throughput exceeds the predetermined decoding throughput threshold. In some cases, the UE may use a PDSCH skipping rule as part of reducing the decoding throughput on one or more subsequent transmissions, TBs, or a combination thereof.

Aspects of the disclosure are initially described in the context of a wireless communications system. An additional wireless communications system and a process flow are then provided to describe aspects of the disclosure. Aspects of the disclosure are further illustrated by and described with reference to apparatus diagrams, system diagrams, and flowcharts that relate to resolving decodability for subsequent transmissions.

FIG. 1 illustrates an example of a wireless communications system 100 that supports resolving decodability for subsequent transmissions whose throughput exceeds a threshold in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, base stations acting as relays (e.g., intermediary base stations forwarding transmissions to and from other base stations), and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support subsequent transmissions (e.g., retransmissions) of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and subsequent transmission or retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A transmitting device (e.g., a base station 105) may broadcast control information including one or more control channels, such as a physical broadcast control channel (PBCH); a primary synchronization signal (PSS); a secondary synchronization signal (SSS); a physical control format indicator channel (PCFICH); a physical HARQ indicator channel (PHICH); and/or a physical downlink control channel (PDCCH), etc., to one or more receiving devices (e.g., UEs 115). The PHICH carries HARQ feedback transmissions such as an acknowledgment (ACK) or negative acknowledgment (NACK). HARQ may involve checking packet transmissions at the receiving device for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. HARQ retransmission may be performed for uplink traffic and downlink traffic.

Uplink and downlink transmissions may generally utilize a suitable error correcting block code. In a typical block code (i.e., a codeword), an information message or sequence is split up into CBs, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, LDPC codes, and polar codes. Various implementations of base stations 105 and UEs 115 may include suitable hardware and capabilities (e.g., an encoder and/or decoder) to utilize any one or more of these error correcting codes for wireless communication.

As noted above, LDPC codes may be one type of error correcting codes which use an iterative coding system. Regular LDPC codes may be linear block codes (e.g., codewords) in which most of the elements of its parity check matrix H are '0'. LDPC codes can be represented by bipartite graphs (often referred to as "Tanner graphs"). In a bipartite graph, a set of variable nodes corresponds to bits of a codeword (e.g., information bits or systematic bits), and a set of check nodes corresponds to a set of parity-check constraints that define the code. Edges in the graph connect variable nodes to check nodes. Thus, the nodes of the graph are separated into two distinctive sets with edges connecting nodes of two different types—variable and check.

Graphs as used in LDPC coding may be characterized in a variety of manners. A lifted code is created by copying a bipartite base graph (G) (or a protograph), a number of times, Z. The number of times is referred to herein as the lifting, lifting size, or lifting size value. A variable node and a check node are considered "neighbors" if they are connected by an "edge" (i.e., the line connecting the variable node and the check node) in the graph. In addition, for each edge (e) of the bipartite base graph (G), a permutation (generally an integer value associated with the edge permutation that is represented by k and referred to as the lifting value) is applied to the Z copies of edge (e) to interconnect the Z copies of the bipartite base graph (G). A bit sequence having a one-to-one association with the variable node sequence is a valid codeword if and only if, for each check node, the bits associated with all neighboring variable nodes sum to 0 modulo 2 (i.e., they include an even number of 1's). The resulting LDPC code may be quasi-cyclic (QC) if the permutations (liftings values) used are cyclic. Two base graphs may be defined based on a number of columns for each graph, resulting in two families of LDPC codes. For example, a first base graph may include 66 columns, and a second base graph may include 50 columns. Codewords transmitted according to either base graph may include a number of bits equal to the corresponding number of columns multiplied by a lifting size (Z).

In some cases, the error correcting codes (e.g., LDPC) may include a circular buffer that indicates how many bits a decoder has to decode for a codeword. The circular buffer may include different redundancy versions (RVs) to indicate where the bits for the codeword start within an encoded information message, where four different types of RVs are defined. For example, a first RV (e.g., a redundancy version zero (RV0)) may indicate that the codeword starts at bit zero (0) of the encoded information message, a second RV (e.g., a redundancy version one (RV1)) may indicate that the codeword starts at roughly the quarter mark of the encoded information message, a third RV (e.g., a redundancy version two (RV2)) may indicate that the codeword starts at the halfway mark of the encoded information message, and a fourth RV (e.g., a redundancy version three (RV3)) may indicate that the codeword starts at roughly the five-sixths mark of the encoded information message. Once bits of the encoded information message reach the end of the encoded information message for the second, third, and fourth RVs, the bits may wrap around to bit zero (0) of the encoded information message (e.g., circle around based on the circular buffer). In some cases, initial transmissions may be transmitted according to RV0 (e.g., the first RV).

TBs may be divided into smaller codeblocks, which may be bundled together to form multiple codeblock groups (CBGs) within the TB. A codeword may be defined as the total number of codeblocks within the TB plus additional bits for error detection. A CBG may include one or more codeblocks of the same TB. When one or more of the codeblocks is not successfully transmitted to a receiving device (e.g., a UE 115), the receiving device may transmit a NACK for the corresponding CBG that includes the unsuccessfully transmitted codeblock. In some cases, an ACK/NACK feedback bit may be reserved for each CBG of the codeword. For each CBG for which a NACK has been transmitted, a transmitting device (e.g., a base station 105) may transmit those respective CBGs as part of a subsequent transmission using a HARQ process, rather than transmitting the entire TB in the subsequent transmission.

A UE 115 may be designed to sustain a peak decoding throughput based on a maximum TBS when decoding a received codeword in a corresponding TB. The maximum TBS may be based on a largest TBS transmitted in a PDSCH within a slot (e.g., fourteen symbols). In some cases, however, a decoding throughput may exceed the peak decoding throughput. For example, subsequent TBs may be transmitted at a lower code rate than code rates for first (e.g., initial) transmissions of the TB, resulting in more time needed to decode the subsequent transmissions and an increased decoding throughput (e.g., the UE 115 may attempt to decode a same number of codeblocks at the lower code rate, increasing the amount of time needed to decode the codeblocks). Accordingly, the UE 115 may employ LBRM to decode TBs with lower code rates by limiting the number of codeblocks to rate-match and decode. However, additional scenarios may exist that cause the decoding throughput to exceed the peak decoding throughput.

In some cases, a high decoding throughput may be caused when a TB is transmitted as part of a subsequent transmission at or near a peak code rate, where the subsequent transmission of the TB is transmitted at a significantly lower mother code rate than a code rate for LBRM (e.g., 2/3 rate). Additionally, multiple numerologies (e.g., SCSs) may be configured across different BWPs of a downlink when the TB is transmitted at or near the peak code rate further causing the higher decoding throughput. For example, the decoding throughput may be increased when one BWP has 100 MHz with 30 kHz SCS (e.g., a first numerology) and one BWP also has 100 MHz but with 60 kHz SCS (e.g., a second numerology).

Additionally or alternatively, the decoding throughput may exceed the peak decoding throughput when a TB is transmitted with a significantly lower mother code rate and with a much shorter PDSCH duration (L) than a slot duration. For example, the PDSCH duration may include seven (7) symbols or less. In some cases, the decoding throughput may not exceed the peak decoding throughput for the shorter PDSCH duration if the UE 115 is capable of processing the PDSCH across multiple slots (e.g., processing capability 1) and may or may not exceed the peak decoding throughput for the shorter PDSCH duration if the UE 115 is capable of processing the PDSCH within one slot. Additionally or alternatively, the decoding throughput may exceed the peak decoding throughput when a subsequent transmission of a TB (e.g., a retransmission) occurs on a much shorter PDSCH duration than an initial TB transmission. For example, the initial TB transmission may occur on fourteen (14) symbols and the subsequent transmission of the TB may occur on seven (7) symbols.

Accordingly, performance may not be expected to be optimized based on the above described scenarios in which subsequent transmissions of a TB occur at or near a peak coding rate. For example, the UE 115 may not be expected to optimally decode a subsequent transmission of a TB when the TB is transmitted with a significantly lower code rate (considering initial transmission and subsequent transmission) than a code rate for LBRM (e.g., 2/3), the subsequent transmission occurs on a much shorter PDSCH duration than the initial transmission, or a combination thereof. However, more stringent requirements may be needed to prevent decoding hardware on the UE 115 from being overprovisioned.

Wireless communications system 100 may support efficient techniques for employing a decodability condition based on a peak-throughput threshold (e.g., a predetermined decoding throughput threshold), where if a decoding throughput (e.g., an effective UE throughput) for a TB is above the threshold, a UE 115 is not required to decode the TB (or one or more subsequent transmissions of the TB). The peak-throughput threshold may be based on a maximum TBS, a throughput required to decode a TB of the maximum TBS transmitted in a fourteen-symbol duration, a number of codeblocks for transmitting a TB of the maximum TB size, a length of a codeblock-level CRC, a length of a TB-level CRC, a coding rate for transmitting a TB of maximum TB size with LBRM enabled, a scaling factor, or a combination thereof.

Additionally, the decoding throughput may be based on an SCS for the one or more subsequent transmissions, a minimum SCS configured for a CC, a number of transmitted codeblocks in the TB, a circular buffer size, a PDSCH duration for the one or more subsequent transmissions, a set of TBs scheduled in a fourteen-consecutive-symbol duration, or any combination thereof. Accordingly, the UE may decode one or more subsequent transmissions of the TB if the decoding throughput is less than the predetermined decoding throughput threshold or may refrain from decoding the subsequent transmissions of the TB if the decoding throughput exceeds the predetermined decoding throughput threshold.

Figure 2:
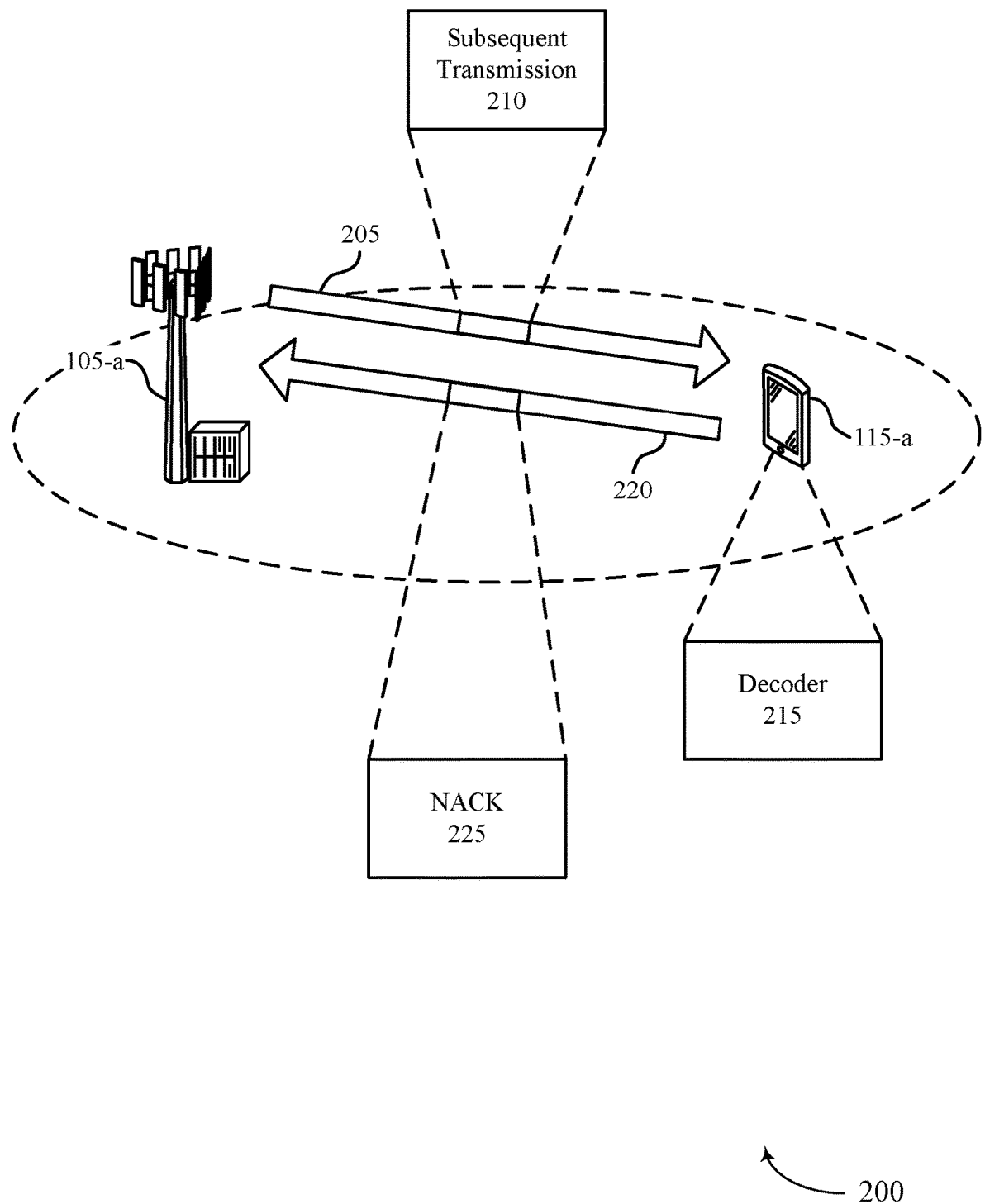
FIG. 2 illustrates an example of a wireless communications system that supports resolving decodability for subsequent transmissions whose throughput exceeds a threshold in accordance with aspects of the present disclosure.

FIG. 2 illustrates an example of a wireless communications system 200 that supports resolving decodability for subsequent transmissions whose throughput exceeds a threshold in accordance with aspects of the present disclosure. In some examples, wireless communications system 200 may implement aspects of wireless communications system 100. Wireless communications system 200 may include a base station 105-$a$ and a UE 115-$a$, which may be examples of corresponding base stations 105 and UEs 115 as described with reference to FIG. 1. As described herein, base station 105-$a$ and UE 115-$a$ may support a LDPC coding scheme for transmitting and receiving downlink information.

$$\frac{TBS_{max}}{14} bits,$$

UE 115-$a$ may be designed to sustain an information throughput for where 14 is the slot duration in symbols and $TBS_{max}$ indicates a maximum TBS. For a more accurate number of bits for the throughput, CRC bits may be included in the calculation, such that UE 115-$a$ may sustain information throughput up to a predetermined decoding throughput threshold ($TP_{max}$). $TP_{max}$ may be given as follows in Equation 1.

$$TP_{max} = \frac{1}{R_{LBRM}} \frac{TBS_{max} + C_{max} \cdot L_{CB,CRC} + L_{TB,CRC}}{14} \quad (1)$$

where $TBS_{max}$ is a maximum TBS, $C_{max}$ is the number of codeblocks in a TB of size $TBS_{max}$, $L_{CB,CRC}$ is the length of the codeblock-level CRC, $L_{TB,CRC}$ is the length of the TB-level CRC, and $R_{LBRM}$ is the code rate associated with the LBRM. A codeblock-level CRC may be the CRC applied to codeblocks of a TB, and a TB-level CRC may be the CRC applied to the TB itself.

In some cases, a scaling factor (f) may be included when calculating $TP_{max}$. For example, f may be defined for all UEs 115 and $TP_{max}$ calculations as indicated by the network (e.g., via base station 105-$a$). Additionally or alternatively, f may be a UE-capability for UE 115-$a$. Accordingly, f may increase or decrease $TP_{max}$ by a small percentage (e.g., 10-20%) to provide an expanded or narrowed window of decoding throughputs that may be close to the calculated $TP_{max}$ (e.g., a relaxation for decoding throughputs). In some cases, f may be a fixed value (e.g., as indicated by base station 105-$a$, as a UE-capability of UE 115-$a$, etc.) to adjust the range of decoding throughputs for $TP_{max}$. When including f in the $TP_{max}$ calculation, $TP_{max}$ may be given as follows by Equation 2.

$$TP_{max} = f \cdot \frac{1}{R_{LBRM}} \frac{C_{max} \cdot L_{CB,CRC} + L_{TB,CRC}}{14} \quad (2)$$

Initially, UE 115-$a$ may receive a first transmission with a TB from base station 105-$a$. In some cases, as described herein, the first transmission may be received according to an RV0 (e.g., the first redundancy version as described above in FIG. 1, where the first transmission begins at a bit zero (0) of an encoded information message). However, UE 115-$a$ may be unable to decode the first transmission and request a subsequent transmission including the TB via transmitting a NACK feedback message. Accordingly, base station 105-$a$ may transmit a subsequent transmission 210 on resources of a carrier 205. As described herein, subsequent transmission 210 may require a decoding throughput by a decoder 215 (e.g., decoding hardware in UE 115-$a$) that exceeds $TP_{max}$ as defined in Equation 1. For example, the decoding throughput may exceed $TP_{max}$ when subsequent transmission 210 is transmitted with a significantly lower code rate than $R_{LBRM}$ (e.g., 2/3), subsequent transmission 210 occurs on a much shorter PDSCH duration than the first transmission, or a combination thereof. In some cases, decoder 215 may be overprovisioned when attempting to decode subsequent transmission 210.

To prevent overprovisioning decoder 215, an effective UE throughput for subsequent transmission 210 may be defined such that if the effective UE throughput exceeds $TP_{max}$, decoder 215 (e.g., UE 115-$a$) may process subsequent transmission 210 by refraining from decoding. Alternatively, UE 115-$a$ may refrain from decoding the TB. For example, when subsequent transmission 210 is one of several subsequent transmissions that include the TB, UE 115-$a$ may refrain from decoding either a) one of the subsequent transmissions (e.g., the last or latest subsequent transmission) of the TB or b) any of the subsequent transmissions of the TB. Thus, in one scenario, UE 115-$a$ may effectively drop a TB by refraining from decoding any subsequent transmission of the TB when the associated effective UE throughput exceeds $TP_{max}$. Alternatively, UE 115-$a$ may process subsequent transmission 210 by decoding some (e.g., one or more) of the subsequent transmissions of the TB prior to (or while) determining the effective UE throughput, but drop the decoded subsequent transmissions and cease decoding subsequent transmissions (e.g., refrain from decoding any additional subsequent transmissions of the TB) after UE 115-$a$ determines that the associated effective UE throughput exceeds $TP_{max}$.

In some cases, a throughput for decoding a TB may be related to a PDSCH duration in symbols (L), a proportion of codeblocks transmitted ($\alpha_{CBG}$), and the LDPC decoder code rate ($R_{LBRM}$). $\alpha_{CBG}$ may be further defined as the ratio of transmitted codeblocks (C') to a total number of codeblocks in the TB (C) of subsequent transmission 210

$$\left( e.g., \alpha_{CBG} = \frac{C'}{C} \right),$$

which can be calculated from codeblock group transmission information (CBGTI) in downlink control information (DCI). C' may indicate the number of codeblocks UE 115-*a* may decode for subsequent transmission 210. For example, subsequent transmission 210 may include a TB with 100 codeblocks distributed in 10 CBGs of 10 codeblocks each. Accordingly, if one or more codeblocks in one CBG are not received correctly initially, subsequent transmission 210 may only include the one CBG (e.g., 10 codeblocks) and UE 115-*a* may decode the 10 codeblocks in the one CBG (e.g., C'=10). In some cases, $\alpha_{CBG}$ may equal one (1) if CBG-based subsequent transmission is not used for subsequent transmission 210 (e.g., UE 115-*a* decodes all of the codeblocks transmitted).

$R_{LDPC}$ may be given as $$\frac{K_r}{N_{cb}} = \frac{TBS + (C \cdot L_{CB,CRC}) + L_{TB,CRC}}{C \cdot N_{cb}},$$

where C is the number of codeblocks in the current TB of size TBS, $K_r$ is the LDPC payload size, and $N_{cb}$ is a circular buffer size (e.g., maximum possible number of coded bits per codeblock without repetition). Accordingly, the decoding throughput for the TB may be defined below.

$$\alpha_{CBG} \cdot \frac{1}{R_{LDPC}} \cdot \frac{TBS + (C \cdot L_{CB,CRC}) + L_{TB,CRC}}{L} =$$
$$\frac{C'}{C} \cdot \frac{C \cdot N_{cb}}{TBS + (C \cdot L_{CB,CRC}) + L_{TB,CRC}}.$$
$$\frac{TBS + (C \cdot L_{CB,CRC}) + L_{TB,CRC}}{L} = \frac{C' \cdot N_{cb}}{L}$$

where C' is the number of transmitted codeblocks in the TB, $N_{cb}$ is the circular buffer size for the TB, and L is the PDSCH duration in symbols. As such, a proposed decodability may be given as follows by Equation 3.

$$\frac{C' \cdot N_{cb}}{L} > TP_{max} \quad (3)$$

Accordingly, UE 115-*a* may refrain from decoding a subsequent transmission (e.g., subsequent transmission 210) of a TB when the condition given by Equation 3 is satisfied. Alternatively, UE 115-*a* may refrain from decoding the TB at all (e.g., by refraining from decoding any of the subsequent transmissions of the TB, or by dropping decoded subsequent transmissions and/or ceasing to decode any additional subsequent transmissions of the TB).

Additionally, UE 115-*a* may utilize Equation 3 for determining whether to decode subsequent transmission 210 if subsequent transmission 210 is transmitted not using an RV0 of a TB (e.g., if subsequent transmission 210 is transmitted using RV1, RV2, or RV3 as described above in FIG. 1, indicating where subsequent transmission 210 begins within an encoded information message). For example, RV0 may not be expected to lower a code rate of the TB significantly to affect the decoding throughput of the TB, and as such, if the TB is transmitted with RV0, UE 115-*a* may attempt to decode the TB. That is, UE 115-*a* may determine whether to decode based on the redundancy version used to transmit the TB. Alternatively, UE 115-*a* may determine whether to decode independent of the redundancy version used to transmit the TB. Further, Equation 3 may be utilized when subsequent transmission 210 is transmitted in a PDSCH longer than a mini-slot duration but may not account for SCS or back-to-back subsequent transmissions 210 with PDSCH durations of mini-slots.

As shown in Equations 1 and 2, $TP_{max}$ for UE 115-*a* may be calculated independent of SCS. However, an SCS-derived scaling factor (μ) may be added to the decoding throughput of a TB to account for the change in time available for decoding when a CC contains BWPs, each with different SCS, and the highest of the different SCSs is used when calculating the decoding throughput. SCS may be defined as $15 \times 2^\mu$ kHz. $\mu_0$ may correspond to a minimum SCS configured for a CC. In some cases, $\mu_0$ may indicate a maximum number of physical RBs (PRBs) across all configured BWPs on a carrier and the minimum SCS that UE 115-*a* is able to decode. μ may correspond to the SCS of the current transmission. The decodability condition may be updated from Equation 3 to account for one or more different SCS values on a same CC and may be given as follows by Equation 4.

$$2^{\mu - \mu_0} \cdot \frac{C' \cdot N_{cb}}{L} > TP_{max} \quad (4)$$

where μ relates to an SCS for subsequent transmission 210 such that $SCS = 15 \cdot 2^\mu$, $\mu_0$ relates to a minimum SCS configured for a CC, C' is a number of transmitted codeblocks in the TB, $N_{cb}$ is a circular buffer size, and L is a PDSCH duration for subsequent transmission 210. In some cases, UE 115-*a* may utilize Equation 4 for determining how to process subsequent transmission 210 if subsequent transmission 210 is not transmitted using an RV0 of a TB (e.g., if the subsequent transmission 210 is transmitted using a redundancy version other than RV0, such as RV1, RV2, or RV3). Alternatively, UE 115-*a* may use Equation 4 for determining how to process subsequent transmission 210 regardless of the redundancy version used (e.g., UE 115-*a* may use Equation 4 to determine whether to decode even if subsequent transmission 210 is transmitted using RV0). Further, Equation 3 may be utilized when subsequent transmission 210 is transmitted in a PDSCH longer than a mini-slot duration and, as described herein, involves multiple SCS values.

In some cases, multiple PDSCH transmissions may occur in a duration of 14 consecutive symbols. For example, back-to-back short PDSCH transmissions (e.g., each lasting for a duration of a mini-slot or another length less than 14 consecutive symbols) may occur such that subsequent transmission 210 includes two TBs transmitted in a transmission previous to the subsequent transmission 210. Accordingly, the decodability condition may be updated to accommodate multiple TBs and may be given as follows by Equation 5.

$$2^{\mu - \mu_0} \cdot \sum_{i \in S} \frac{C'_i \cdot N_{cb,i}}{L_i} > TP_{max} \quad (5)$$

where μ relates to an SCS for one TB in subsequent transmission 210 such that $SCS = 15 \cdot 2^\mu$, $\mu_0$ relates to a minimum SCS configured for a CC, C' is a number of transmitted codeblocks in a current TB, $N_{cb}$ is a circular buffer size, $L_i$ is a PDSCH duration for the current TB of subsequent transmission 210, S is a set of TBs scheduled in a fourteenconsecutive-symbol duration, and i may indicate each TB in set S. In some cases, Equation 5 may be used regardless of which RV is used per TB (or per subsequent transmission). Alternatively, Equation 5 may be used if subsequent transmission 210 does not use RV0 (e.g., if subsequent transmission 210 uses a redundancy version other than RV0). Additionally, $L_i$ may be fixed at 14 symbols.

As given by Equation 5, if the decoding throughput for subsequent transmission 210 (or any additional transmissions) causes UE 115-a to exceed $TP_{max}$, UE 115-a (or decoder 215) may refrain from decoding subsequent transmission 210. Alternatively, UE 115-a (or decoder 215) may refrain from decoding any of the TBs sent within the fourteen-consecutive-symbol duration (e.g., none of the TBs sent within the fourteen-consecutive-symbol duration may be decoded). For example, UE 115-a may refrain from decoding any of the TBs in set S. Thus, if two TBs are sent in the fourteen-consecutive-symbol duration, UE 115-a may refrain from decoding both TBs, even if only one of the TBs (or one subsequent transmission of one of the TBs) causes the condition in Equation 5 to be satisfied.

In some cases, when subsequent transmission 210 includes more than one TB transmitted (e.g., retransmitted) within an active BWP, the PDSCH durations of the more than one subsequently transmitted TBs may include different durations within the active BWP. For example, the durations of the subsequently transmitted TBs may vary from two (2) OFDM symbols to 14 OFDM symbols, such that the TB is transmitted with a shorter PDSCH duration (L) than a slot duration. Accordingly, $TP_{max}$ may be defined as follows in Equation 6.

$$TP_{max} = \frac{1}{R_{LBRM}} \frac{TBS_{LBRM}}{14} \quad (6)$$

where $TBS_{LBRM}$ is the maximum TB size with LBRM enabled, and where $R_{LBRM}$ is a coding rate when transmitting a TB of the maximum TB size with LBRM enabled (e.g., 2/3). Equation 6 may be derived from Equation 1, where $L_{CB,CRC}$ and $L_{TB,CRC}$ go to zero (0) based on UE 115-a refraining from performing the CRC on the codeblock and TB when multiple TBs are included in subsequent transmission 210.

Additionally, when $TP_{max}$ is defined by Equation 6 above, UE 115-a (or decoder 215) may not be expected to handle decoding any TBs in a 14 consecutive-symbol duration for a normal cyclic prefix (or 12 consecutive-symbol duration for an extended cyclic prefix) ending at the last symbol of the latest occurring PDSCH transmission within the active BWP on a serving cell based on a decodability condition given as follows by Equation 7 (e.g., a PDSCH skipping rule).

$$2^{max(0,\mu-\mu')} \cdot \sum_{i \in S} \left\lfloor \frac{C_i'}{L_i} \right\rfloor \cdot F_i > TP_{max} \quad (7)$$

where μ relates to an SCS for the one or more TBs in subsequent transmission 210 for the active BWP, μ' corresponds to an SCS of a BWP across all configured BWPs of a carrier that has a largest configured number of PRBs, $C_i'$ is a number of scheduled codeblocks for an $i^{th}$ TB, $L_i$ is a PDSCH duration for the $i^{th}$ TB, S is a set of TBs scheduled partially or fully in a consecutive-symbol duration for the $i^{th}$ TB, and $F_i$ is a number of coded bits in a codeblock and is a maximum value of a $min(k_{0,i}^j + E_i^j, N_{cb,i})$, where $k_{0,i}^j$ is a starting location of a redundancy value for a $j^{th}$ transmission, $E_i^j$ is a $min(E_r)$ of scheduled code blocks for the $j^{th}$ transmission, $N_{cb,i}$ is a circular buffer length, where j ranges from 0 to J−1, where J−1 is a current subsequent transmission for the $i^{th}$ TB. In some cases, $$2^{max(0,\mu-\mu')} \cdot \sum_{i \in S} \left\lfloor \frac{C_i'}{L_i} \right\rfloor \cdot F_i$$

may represent the effective UE throughput (e.g., an initial UE throughput) for UE 115-a (or decoder 215). Additionally, $$\left\lfloor \frac{C_i'}{L_i} \right\rfloor$$

may represent a floor function that takes a real number input calculated by $$\frac{C_i'}{L_i}$$

(e.g., a decimal number in some cases) and outputs an integer less than or equal to the real number input (e.g., the floor function rounds the real number down to the lowest whole number of the real number input, such as 2.4 becomes 2 and 2.8 also becomes 2).

Equations 6 and 7 may assume the number of OFDM symbols of the one or more TBs in subsequent transmission 210 are constant (e.g., 14 OFDM symbols). However, in some cases, the number of OFDM symbols may differ from TB to TB in an active BWP. Accordingly, in such cases, $TP_{max}$ may be defined as follows in Equation 8.

$$TP_{max} = \frac{1}{R_{LBRM}} TBS_{LBRM} \quad (8)$$

where $TBS_{LBRM}$ is the maximum TB size with LBRM enabled, and where $R_{LBRM}$ is a coding rate when transmitting a TB of the maximum TB size with LBRM enabled (e.g., 2/3).

The decodability condition may similarly be adjusted to address the variability in the number of OFDM symbols of the multiple TBs in subsequent transmission 210. For example, UE 115-a (or decoder 215) may not be expected to handle decoding any TBs in a 14 consecutive-symbol duration for a normal cyclic prefix (or 12 consecutive-symbol duration for an extended cyclic prefix) ending at the last symbol of the latest occurring PDSCH transmission within the active BWP on a serving cell based on a decodability condition given as follows by Equation 9 or Equation 9-1 or Equation 9-2 (e.g., the PDSCH skipping rule).

$$2^{max(0,\mu-\mu')} \cdot \sum_{i \in S} \left\lfloor \frac{C_i'}{L_i} \right\rfloor \cdot x_i F_i > TP_{max} \quad (9)$$

$$2^{max(0,\mu-\mu')} \cdot \sum_{i \in S} \left\lfloor \frac{C'_i}{L_i} F_i \right\rfloor \cdot x_i > TP_{max} \qquad (9\text{-}1)$$

$$\sum_{i \in S} \left\lfloor \frac{C'_i}{L_i} \right\rfloor \cdot x_i F_i > TP_{max} \qquad (9\text{-}2)$$

where μ relates to an SCS for the one or more TBs in subsequent transmission 210 for the active BWP, μ' corresponds to an SCS of a BWP across all configured BWPs of a carrier that has a largest configured number of PRBs, $C'_i$ is a number of scheduled codeblocks for an $i^{th}$ TB, $L_i$ is a PDSCH duration for the $i^{th}$ TB, S is a set of TBs scheduled partially or fully in a consecutive-symbol duration for the $i^{th}$ TB, $x_i$ is a number of OFDM symbols of the one or more subsequent transmissions of the $i^{th}$ TB, and $F_i$ is a number of coded bits in a codeblock and is a maximum value of a min($k_{0,i}^j + E_i^j$, $N_{cb,i}$) where $k_{0,i}^j$ is a starting location of a redundancy value for a $j^{th}$ transmission, $E_i^j$ is a min($E_r$) of scheduled code blocks for the $j^{th}$ transmission, $N_{cb,i}$ is a circular buffer length, where j ranges from 0 to J−1, where J−1 is a current subsequent transmission for the $i^{th}$ TB. Based on a ratio between $x_i$ and $L_i$ (e.g., the OFDM symbols used for the subsequent transmission of the TB compared with an allocated number of OFDM symbols/duration of a PDSCH configured for a TB transmission, such as the initial TB transmission, the subsequent transmission of the TB, etc.), UE 115-*a* (e.g., or the decoder 215) may scale the effective UE throughput based on how many OFDM symbols are used for the subsequent transmission of the TB. For example, $$2^{max(0,\mu-\mu')} \cdot \sum_{i \in S} \left\lfloor \frac{C'_i}{L_i} \right\rfloor \cdot F_i$$

may represent an initial UE throughput for UE 115-*a* (or decoder 215), which is then scaled by the ratio between $x_i$ and $L_i$ for Equations 9, 9-1, and 9-2. Additionally, $$\left\lfloor \frac{C'_i}{L_i} \right\rfloor \text{ and } \left\lfloor \frac{C'_i}{L_i} F_i \right\rfloor$$

may represent floor functions as described above for the real number inputs calculated by $$\frac{C'_i}{L_i} \text{ and } \frac{C'_i}{L_i} F_i,$$

respectively.

Equations 5 through 9 may assume that BWP switching may not occur fast enough to accommodate different SCSs for each TB. As such, multiple TBs within a 14-symbol duration may be assumed to be of the same numerology (e.g., SCS). However, if BWP switching does occur within the same 14-symbol duration, the decodability condition may be given as follows by Equation 10.

$$\sum_{i \in S} 2^{\mu_i - \mu_0} \cdot \frac{C'_i \cdot N_{cb,i}}{L_i} > TP_{max} \qquad (10)$$

where $\mu_i$ relates to an SCS for a current TB in subsequent transmission 210 such that SCS=15·$2^{\mu_i}$, $\mu_0$ relates to a minimum SCS configured for a CC, C' is a number of transmitted codeblocks in the current TB, $N_{cb}$ is a circular buffer size, L is a PDSCH duration for subsequent transmission 210, S is a set of TBs scheduled in a fourteen-consecutive-symbol duration, and i may indicate each TB in set S.

Equations 3-6 may assume that f is one (1) (e.g., $TP_{max}$ is not scaled). However, Equation 5 may more generally be defined to include f as given by Equation 11.

$$2^{\mu-\mu_0} \cdot \sum_{i \in S} \frac{C'_i \cdot N_{cb,i}}{L_i} > f \cdot TP_{max} \qquad (11)$$

As noted above, f may provide an additional window around $TP_{max}$ to accommodate decoding throughputs that are near $TP_{max}$. For example, $TP_{max}$ may originally be calculated to be 10 gigabytes per second (GB/s), but the decoding throughput for subsequent transmission 210 may be calculated as 10.1 GB/s. As such, it may be unnecessary to discount the calculated decoding throughput and refrain from decoding subsequent transmission 210 (or the TB) based on a small difference from $TP_{max}$ (e.g., 1%). By including an f greater than 1 (e.g., f=1.1), UE 115-*a* may still decode subsequent transmission 210 (or the TB) even though the decoding throughput is greater than $TP_{max}$.

Additionally, based on Equations 5-7, UE 115-*a* may not be required to decode a latest (e.g., last) subsequent transmission 210. For example, UE 115-*a* may receive multiple TBs in subsequent transmission 210, but refrain from decoding the last received TB, while attempting to decode the other received TB in subsequent transmission 210. Additionally or alternatively, UE 115-*a* may receive multiple subsequent transmissions 210 and refrain from decoding the last received subsequent transmission of the multiple subsequent transmissions 210. Or, UE 115-*a* may receive multiple subsequent transmissions 210 and refrain from decoding any of the multiple subsequent transmissions 210.

Equation 11 may provide the most general decodability condition for UE 115-*a* to determine how to process, including whether or not to decode, subsequent transmission 210 (e.g., determine whether UE 115-*a* is required to decode subsequent transmission 210). If the decoding throughput $$\left( e.g., 2^{\mu - \mu_0} \cdot \sum_{i \in S} \frac{C'_i \cdot N_{cb,i}}{L_i} \right)$$

is less than the predetermined decoding throughput threshold multiplied by the scaling factor (e.g., f·$TP_{max}$), then decoder 215 may decode subsequent transmission 210 and respond accordingly. However, as described herein, if the decoding exceeds the predetermined decoding throughput threshold multiplied by the scaling factor, then decoder 215 may refrain from decoding subsequent transmission 210. Consequently, UE 115-*a* may transmit a NACK 225 on resources of a carrier 220 to base station 105-*a* indicating that subsequent transmission 210 was not decoded. In some cases, carriers 205 and 220 may be the same or different carriers. After receiving NACK 225, base station 105-*a* may attempt a further subsequent transmission or another mitigation to provide UE 115-*a* with the correct downlink information.

Additionally or alternatively, the window length of the active BWP may not be fixed (e.g., at 14 OFDM symbols). Accordingly, $TP_{max}$ may generally be defined as follows in Equation 12.

$$TP_{max} = \frac{1}{R_{LBRM}} \frac{TBS_{LBRM} \cdot \text{window length}}{14} \quad (12)$$

where $TBS_{LBRM}$ is the maximum TB size with LBRM enabled, the window length is a predefined number of consecutive symbols, and $R_{LBRM}$ is a coding rate when transmitting a TB of the maximum TB size with LBRM enabled (e.g., 2/3).

Based on the window length not being fixed in the active BWP, the decodability condition may be given as follows in Equation 13, where UE 115-a (or decoder 215) is not required to decode the latest transmission not using RV0 based on the decodability condition given by Equation 13. Additionally, UE 115-a (or decoder 215) may evaluate the decodability condition given by Equation 13 at the end of a TB.

$$2^{max(0,\mu-\mu')} \cdot \sum_{i \in S} C'_i \cdot F_i > TP_{max} \quad (13)$$

where $\mu$ relates to an SCS for the one or more TBs in subsequent transmission 210 for the active BWP, $\mu'$ corresponds to an SCS of a BWP across all configured BWPs of a carrier that has a largest configured number of PRBs, $C_i'$ is a number of scheduled codeblocks for an $i^{th}$ TB, S is a set of TBs scheduled partially or fully in a consecutive-symbol duration for the $i^{th}$ TB, and $F_i$ is a maximum value of a $min(k_{0,i}^j + E_i^j, N_{cb,i})$, where $k_{0,i}^j$ is a starting location of a redundancy value for a $j^{th}$ transmission, $E_i^j$ is a $min(E_r)$ of scheduled code blocks for the $j^{th}$ transmission, $N_{cb,i}$ is a circular buffer length, where j ranges from 0 to J–1, where J–1 is a current retransmission for the $i^{th}$ TB.

The decodability condition may be defined for all UEs 115. For example, if an effective code rate for UE 115-a exceeds a threshold (e.g., 0.95), UE 115-a may not be expected to decode subsequent transmission 210 (e.g., UE 115-a may skip decoding subsequent transmission 210). Or, UE 115-a may not be expected to decode the TB associated with subsequent transmission 210. For example, when multiple subsequent transmissions are scheduled for a TB, UE 115-a may refrain from decoding any of the subsequent transmissions (e.g., none of the subsequent transmissions may be decoded). Thus, UE 115-a may effectively drop the TB. In such cases, UE 115-a may transmit a NACK for each un-decoded subsequent transmission (e.g., for each subsequent transmission the UE 115-a opted not to decode).

In some cases, a scheduler (e.g., base station 105-a) may avoid transmitting subsequent transmission 210 to UE 115-a if the decodability condition is met, if the decodability threshold would be exceeded, etc. Additionally or alternatively, UE 115-a may still attempt to decode subsequent transmission 210 and transmit HARQ feedback based on whether subsequent transmission 210 is correctly decoded or not. A UE 115 may be designed to accommodate higher data rates than the data rates indicated by the defined decodability condition. However, the scheduler may not assume the UE 115 can accommodate the higher data rates and still not transmit subsequent transmission 210.

Figure 3:
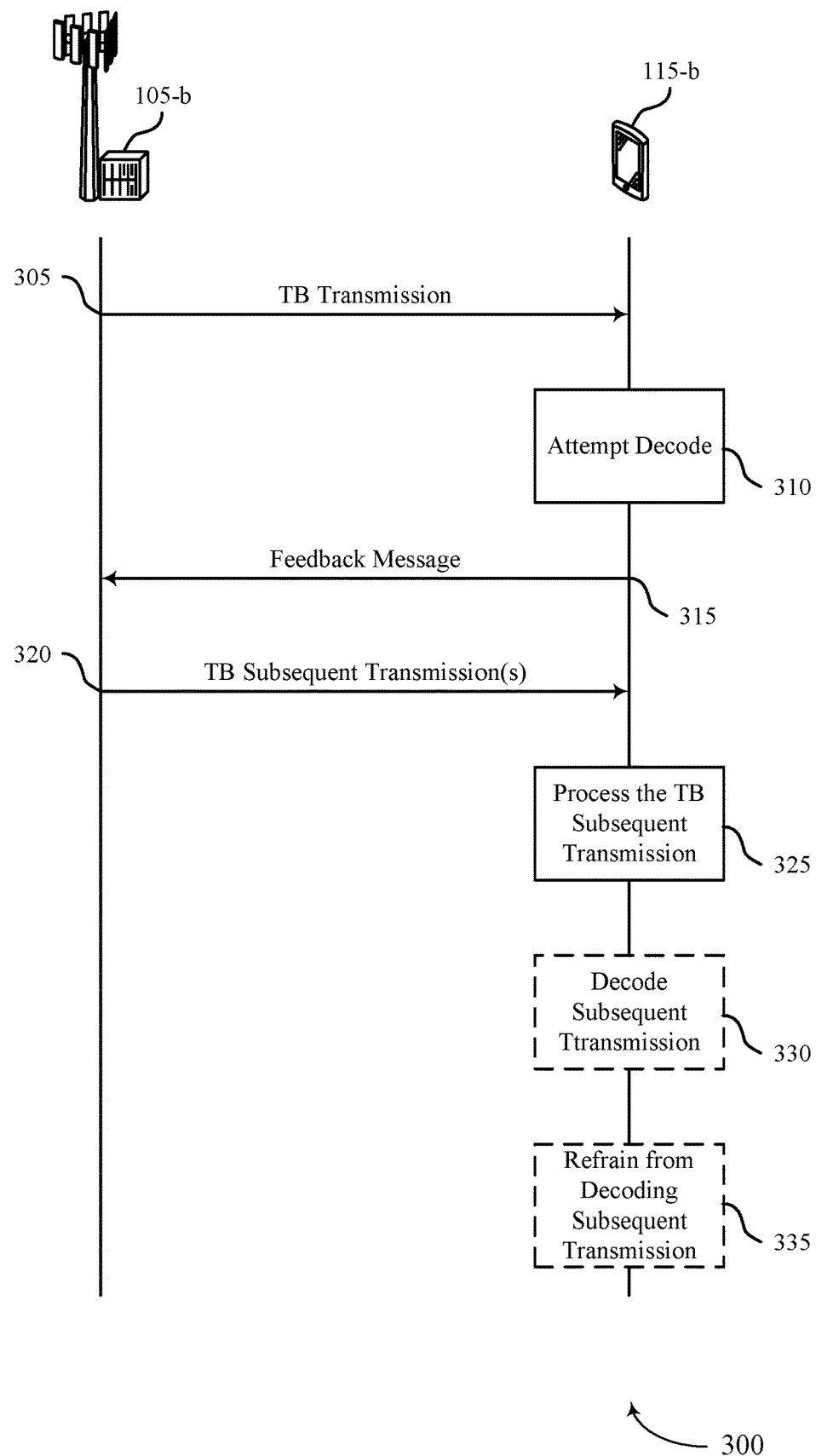
FIG. 3 illustrates an example of a process flow that supports resolving decodability for subsequent transmissions in accordance with aspects of the present disclosure.

FIG. 3 illustrates an example of a process flow 300 that supports resolving decodability for subsequent transmissions in accordance with aspects of the present disclosure. In some examples, process flow 300 may implement aspects of wireless communications systems 100 and/or 200. Process flow 300 may include a base station 105-b and a UE 115-b, which may be examples of corresponding base stations 105 and UEs 115 as described herein with reference to FIGS. 1 and 2. As described herein, base station 105-b and UE 115-b may support a LDPC coding scheme for transmitting and receiving downlink information.

In the following description of the process flow 300, the operations between UE 115-b and base station 105-b may be performed in different orders or at different times. Certain operations may also be left out of the process flow 300, or other operations may be added to the process flow 300. It is to be understood that while UE 115-b is shown performing a number of the operations of process flow 300, any wireless device may perform the operations shown.

At 305, UE 115-b may receive, from base station 105-b, a transmission including a TB.

At 310, UE 115-b may attempt to decode the transmission.

At 315, UE 115-b may transmit a feedback message to base station 105-b indicating that at least a portion of the transmission including the TB was unsuccessfully decoded.

At 320, UE 115-b may receive, from base station 105-b, one or more subsequent transmissions of at least the TB. In some cases, UE 115-b may refrain from decoding any of the one or more subsequent transmissions based on the effective UE throughput of the one or more retransmissions exceeding the predetermined decoding throughput threshold. Or UE 115-b may refrain from decoding the portions of the subsequent transmissions that include the TB. In some cases, UE 115-b may refrain from decoding the TB based on the effective UE throughput of the one or more subsequent transmissions exceeding the predetermined decoding throughput threshold. In some cases, a subsequent transmission of the one or more subsequent transmissions may be a last-received subsequent transmission.

At 325, UE 115-b may process a subsequent transmission of the one or more subsequent transmissions. Processing the subsequent transmission may include determining an effective UE throughput of the one or more subsequent transmissions of at least the TB based on scaling an initial UE throughput (e.g., an unadjusted UE throughput, an effective UE throughput for subsequent transmissions of at least the TB that have a duration equal to a duration of a PDSCH for the TB, etc.) based on a function which is dependent at least upon a duration of a PDSCH for the TB and a number of OFDM symbols of the one or more subsequent transmissions of at least the TB. Additionally, UE 115-b may then determine whether to attempt to decode a subsequent transmission of the one or more subsequent transmissions based on whether the effective UE throughput (e.g., decoding throughput) of the one or more subsequent transmissions exceeds a predetermined decoding throughput threshold. In some cases, UE 115-b may refrain from decoding any of the one or more subsequent transmissions based on the effective UE throughput of the one or more subsequent transmissions exceeding the predetermined decoding throughput threshold. In some cases, UE 115-b may refrain from decoding the TB based on the effective UE throughput of the one or more subsequent transmissions exceeding the predetermined decoding throughput threshold.

In some cases, the predetermined decoding throughput threshold may be based on a throughput for decoding a TB of a maximum TB size transmitted in a fourteen-symbol duration. Additionally, the predetermined decoding throughput threshold may be based on a maximum TBS, a number of codeblocks for transmitting a TB of a maximum TB size, a length of a codeblock-level CRC, a length of a TB-level CRC, a coding rate for transmitting a TB of maximum TB size with LBRM enabled, and a scaling factor. For example, the predetermined decoding throughput threshold may be given by $$TP_{max} = f \cdot \frac{1}{R_{LBRM}} \frac{TBS_{max} + C_{max} \cdot L_{CB,CRC} + L_{TB,CRC}}{14}.$$ (e.g., Equation 2)

In some cases, the scaling factor may be one. Alternatively, the scaling factor may be greater than one.

In some cases, the effective UE throughput of the one or more subsequent transmissions may be based on a number of transmitted codeblocks in the TB, a circular buffer size, and a PDSCH duration for the one or more subsequent transmissions. Accordingly, the effective UE throughput of the subsequent transmission may be applicable for a subsequent transmission whose PDSCH duration is greater than a mini-slot duration but is not applicable for subsequent transmissions involving different SCS values or back-to-back subsequent transmissions whose PDSCH durations are of a mini-slot. For example, the effective UE throughput may be given by $$\frac{C' \cdot N_{cb}}{L}.$$ (e.g., Equation 3)

In some cases, the mini-slot duration may include a duration for a short PDSCH or any duration less than 14 OFDM symbols, where the effective UE throughput is applicable for the subsequent transmission with a PDSCH duration that is greater than this shortened duration of time indicated by the mini-slot duration.

Additionally or alternatively, the effective UE throughput of the one or more subsequent transmissions may be further based on an SCS of the subsequent transmission and a minimum sub-carrier spacing of a component carrier carrying the one or more subsequent transmissions. Accordingly, the effective UE throughput of the subsequent transmission is applicable for a subsequent transmission whose PDSCH duration is greater than a mini-slot duration and is applicable for a subsequent transmission involving different SCS values than the transmission including the TB. For example, the effective UE throughput may be given as $$2^{\mu-\mu_0} \cdot \frac{C' \cdot N_{cb}}{L}.$$ (e.g., Equation 4)

Additionally or alternatively, the effective UE throughput of the one or more subsequent transmissions may be further based on a sum of UE throughputs for multiple TBs in the one or more subsequent transmissions. For example, the effective UE throughput may be given as $$2^{\mu-\mu_0} \cdot \sum_{i \in S} \frac{C'_i \cdot N_{cb}}{L_i}.$$ (e.g., Equation 5)

In some cases, the duration of a PDSCH may be fixed at 14 symbols, such that the effective UE throughput may be given as $$2^{\mu-\mu_0} \cdot \sum_{i \in S} \frac{C'_i \cdot N_{cb,i}}{14}.$$

Additionally or alternatively, the length of the multiple TBs within the one or more subsequent transmissions may vary from TB to TB. Accordingly, in such cases, $TP_{max}$ may be defined as $$\frac{1}{R_{LBRM}} \frac{TBS_{LBRM}}{14}.$$ (e.g., Equation 6)

The effective UE throughput of the one or more subsequent transmissions may be further based on the variable lengths for multiple TBs in the one or more subsequent transmissions. For example, the effective UE throughput may be given as $$2^{max(0,\mu-\mu')} \cdot \sum_{i \in S} \left\lfloor \frac{C'_i}{L_i} \right\rfloor \cdot F_i.$$ (e.g., Equation 7)

In some cases, $$2^{max(0,\mu-\mu')} \cdot \sum_{i \in S} \left\lfloor \frac{C'_i}{L_i} \right\rfloor \cdot F_i$$

may be referred to as the initial UE throughput as indicated above which is scaled based on the duration of a PDSCH for the TB and the number of OFDM symbols of the one or more subsequent transmissions of at least the TB. Additionally, the effective UE throughput of the subsequent transmission may be evaluated for an interval ending at an end of a last symbol of a latest PDSCH transmission when the multiple TBs vary in length.

Additionally, when the length of the TBs vary, the length of PDSCH for the TBs may not be fixed (e.g., at 14 OFDM symbols). As such, $TP_{max}$ may be defined as $$\frac{1}{R_{LBRM}} TBS_{LBRM}.$$ (e.g., Equation 8)

The effective UE throughput of the one or more subsequent transmissions may further based on the variable lengths for multiple TBs in the one or more subsequent transmissions and the length of the PDSCHs. For example, the effective UE throughput may be given as $$2^{max(0,\mu-\mu')} \cdot \sum_{i \in S} \left\lfloor \frac{C'_i}{L_i} \right\rfloor \cdot x_i F_i \text{ or} \quad \text{(e.g., Equation 9)}$$

$$2^{max(0,\mu-\mu')} \cdot \sum_{i \in S} \left\lfloor \frac{C'_i}{L_i} F_i \right\rfloor \cdot x_i \text{ or} \quad \text{(e.g., Equation 9-1)}$$

$$\sum_{i \in S} \left\lfloor \frac{C'_i}{L_i} \right\rfloor \cdot x_i F_i. \quad \text{(e.g., Equation 9-2)}$$

Accordingly, UE 115-b may scale the effective UE throughput (e.g., the initial UE throughput, $$2^{max(0,\mu-\mu')} \cdot \sum_{i \in S} \left\lfloor \frac{C'_i}{L_i} \right\rfloor \cdot F_i)$$

based on the variable lengths for multiple TBs (e.g., based on a ratio of $x_i$ to $L_i$). Additionally, for this throughput, the effective UE throughput of the subsequent transmission may be evaluated for an interval ending at an end of a last symbol of a latest PDSCH transmission.

In some cases, the active BWP may not be fixed at a set number of OFDM symbols (e.g., 14 OFDM symbols). As such, $TP_{max}$ may be defined as $$\frac{1}{R_{LBRM}} \frac{TBS_{LBRM} \cdot \text{window length}}{14}. \quad \text{(e.g., Equation 12)}$$

Additionally, the effective UE throughput may be given as $2^{max(0,\mu-\mu')} \cdot \Sigma_{i \in S} C_i \cdot F_i$ (e.g., Equation 13). Accordingly, the effective UE throughput of the subsequent transmission may be evaluated at an end of a TB.

In some cases, the effective UE throughput of the one or more subsequent transmissions may be applicable for subsequent transmissions that are not using a RV0, RV0 indicating the subsequent transmissions begin at a bit zero of an encoded information message. Additionally or alternatively, the effective UE throughput of the one or more subsequent transmissions may be applicable regardless of a redundancy version used by the one or more subsequent transmissions, the redundancy version indicating a location in an encoded information message where the one or more subsequent transmissions begin.

At 330, UE 115-b may decode the subsequent transmission based on the effective UE throughput of the one or more subsequent transmissions being less than the predetermined decoding throughput threshold.

At 335, UE 115-b may refrain from decoding the subsequent transmission based on the effective UE throughput of the one or more subsequent transmissions exceeding the predetermined decoding throughput threshold.

Figure 4:
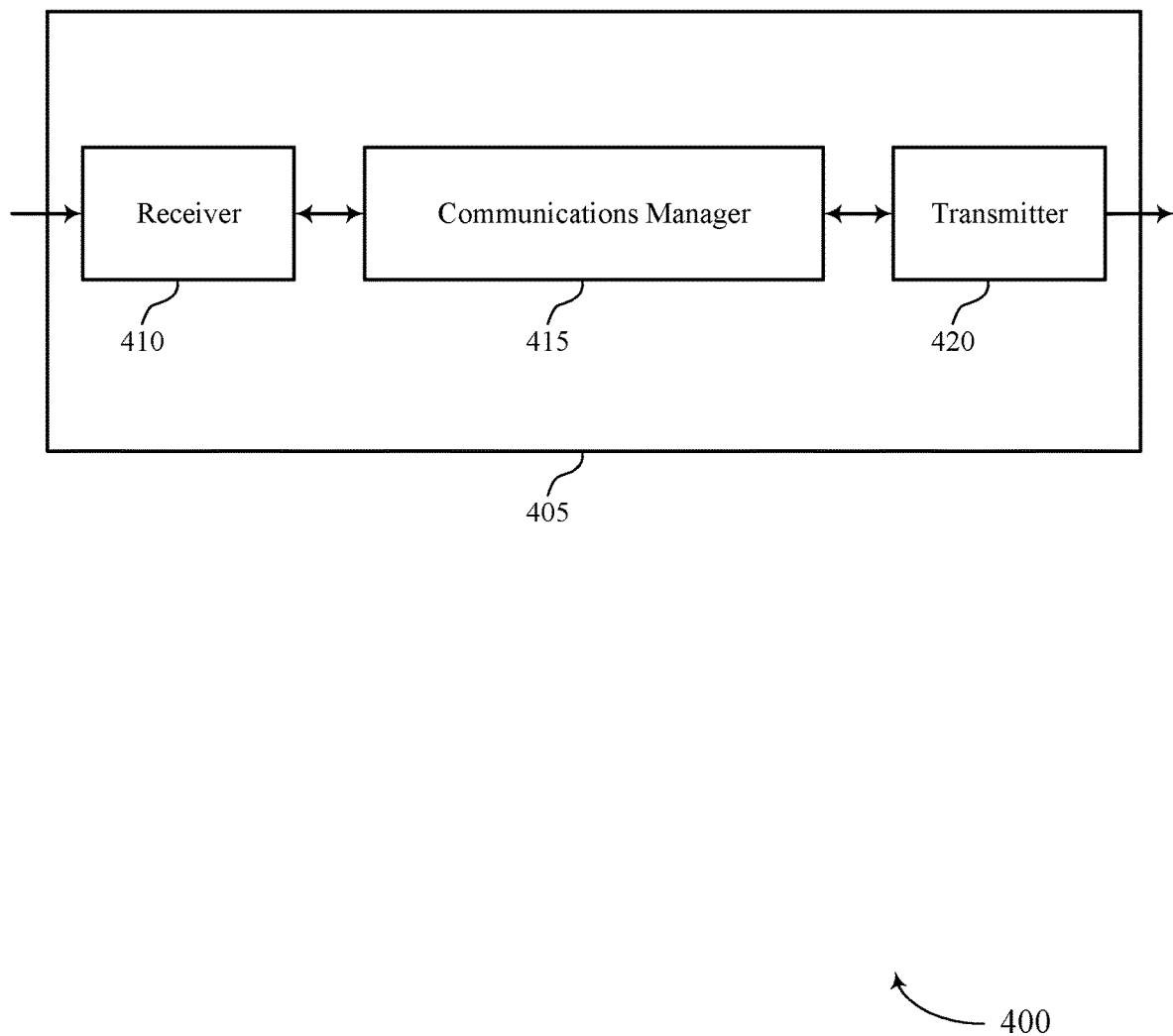
FIGS. 4 and 5 show block diagrams of devices that support resolving decodability for subsequent transmissions in accordance with aspects of the present disclosure.

FIG. 4 shows a block diagram 400 of a device 405 that supports resolving decodability for subsequent transmissions in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to resolving decodability for subsequent transmissions whose throughput exceeds a threshold, etc.). Information may be passed on to other components of the device 405, such as the communications manager 415. The receiver 410 may be an example of aspects of the transceiver 720 described with reference to FIG. 7. The receiver 410 may utilize a single antenna or a set of antennas.

The communications manager 415 may receive, from a base station via the receiver 410, a transmission including a TB, attempt to decode the transmission, transmit a feedback message to the base station indicating that at least a portion of the transmission including the TB was unsuccessfully decoded, and receive, from the base station via the receiver 410, one or more subsequent transmissions of at least the TB. In some cases, the communications manager 415 may process the one or more subsequent transmissions of at least the TB by determining an effective UE throughput of the one or more subsequent transmissions of at least the TB based on scaling an initial UE throughput using a function which is dependent at least upon a duration of a PDSCH for the TB and a number of OFDM symbols of the one or more subsequent transmissions of at least the TB. Additionally, in processing the one or more subsequent transmissions of at least the TB, the communications manager 415 may determine whether to attempt to decode a subsequent transmission based on whether the effective UE throughput of the one or more subsequent transmissions exceeds a predetermined decoding throughput threshold. The communications manager 415 may be an example of aspects of the communications manager 710 described herein.

Based on the actions performed by the communications manager 415 as described herein, a UE 115 may reduce battery power consumption by determining to decode a subsequent transmission (e.g., of at least a TB) based on an effective UE throughput exceeding a predetermined decoding throughput threshold. For example, rather than wasting battery power attempting to decode the subsequent transmission at a higher throughput than supported by the UE, the UE may refrain from decoding the subsequent transmission, thereby saving power.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
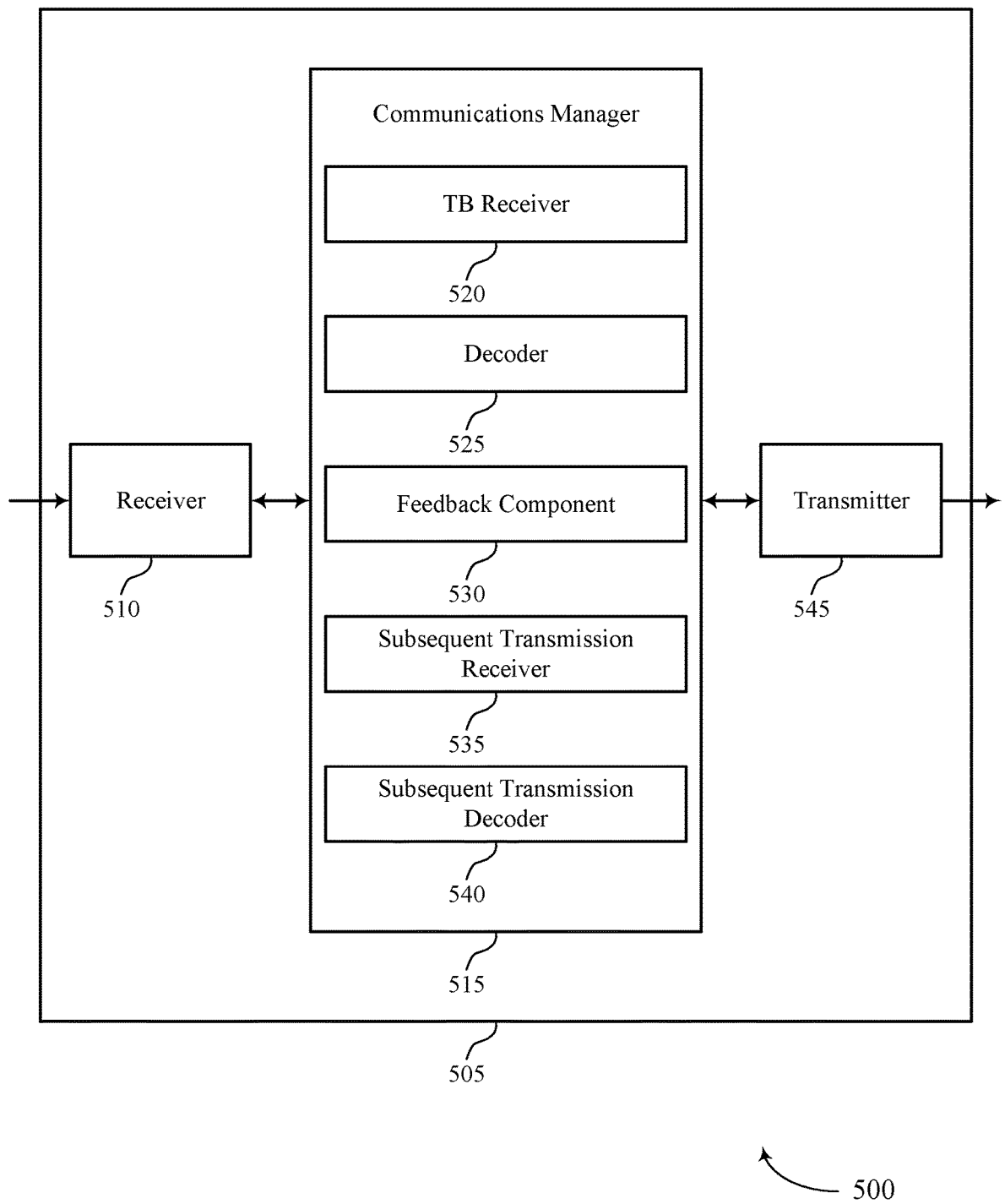

FIG. 5 shows a block diagram 500 of a device 505 that supports resolving decodability for subsequent transmissions in accordance with aspects of the present disclosure. The device 505 may be an example of aspects of a device 405 or a UE 115 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to resolving decodability for subsequent transmissions whose throughput exceeds a threshold, etc.). Information may be passed on to other components of the device 505, such as the communications manager 515. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may be operative to process subsequent transmissions of a TB and may include a TB receiver 520, a decoder 525, a feedback component 530, a subsequent transmission receiver 535, and a subsequent transmission decoder 540. The communications manager 515 may be an example of aspects of the communications manager 710 described herein.

The TB receiver 520 may receive, from a base station via the receiver 510, a transmission including a TB.

The decoder 525 may attempt to decode the transmission.

The feedback component 530 may transmit a feedback message to the base station indicating that at least a portion of the transmission including the TB was unsuccessfully decoded.

The subsequent transmission receiver 535 may receive, from the base station via the receiver 510, one or more subsequent transmissions of at least the TB.

The subsequent transmission decoder 540 may determine an effective UE throughput of the one or more subsequent transmissions of at least the TB based on scaling an initial UE throughput based on a function which is dependent at least upon a duration of a PDSCH for the TB and a number of OFDM symbols of the one or more subsequent transmissions of at least the TB. Additionally, the subsequent transmission decoder 540 may process (e.g., determine whether to attempt to decode) a subsequent transmission of the one or more subsequent transmissions based on whether the effective UE throughput of the one or more subsequent transmissions exceeds a predetermined decoding throughput threshold.

Based on determining whether to attempt to decode the subsequent transmission, a processor of a UE 115 (e.g., controlling the receiver 510, the transmitter 545, or a transceiver 720 as described with reference to FIG. 7) may prevent overburdening other components within the UE 115. For example, a decoder within the UE 115 may be unable to process a subsequent transmission that is transmitted above the predetermined decoding throughput threshold. However, the decoder may still try to process the subsequent transmission and become overburdened, expending unnecessary power and impacting system performance of the UE 115. Accordingly, by determining whether to attempt the decode prior to performing the decoding, the processor may prevent from overloading the decoder (e.g., and any associated components).

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
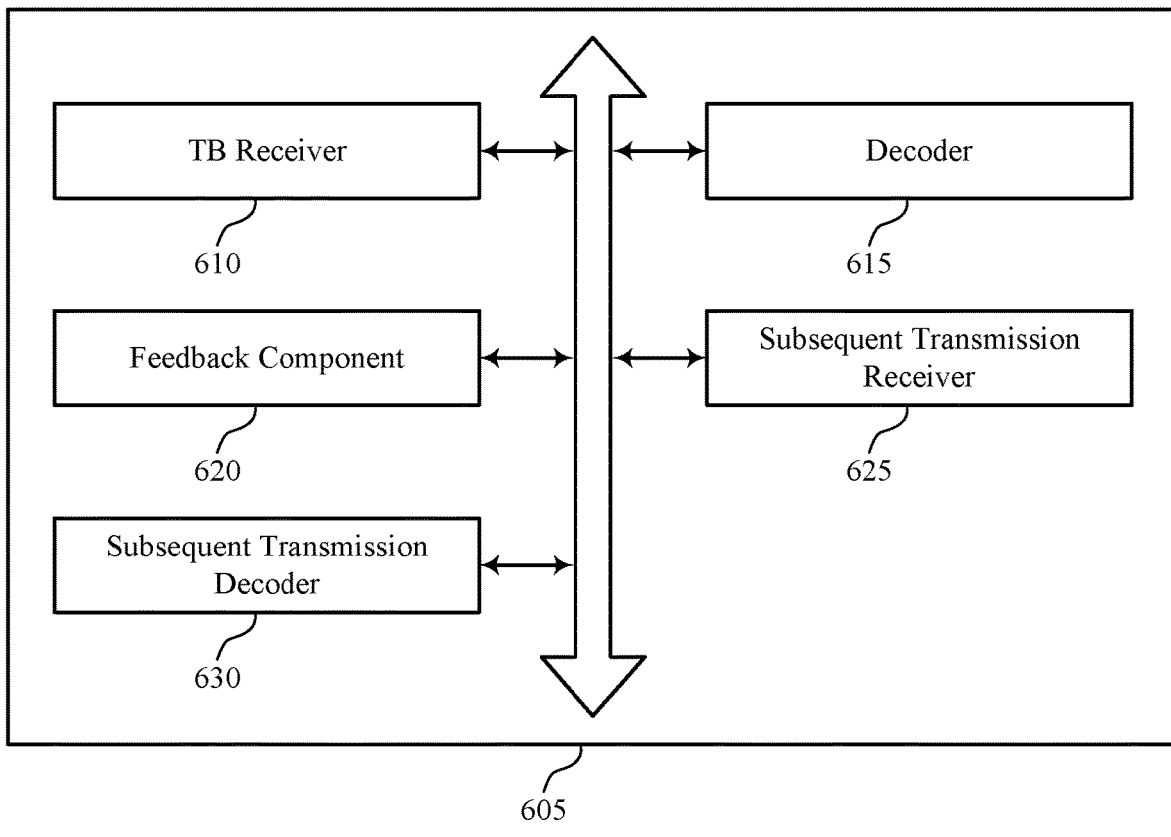
FIG. 6 shows a block diagram of a communications manager that supports resolving decodability for subsequent transmissions in accordance with aspects of the present disclosure.

FIG. 6 shows a block diagram 600 of a communications manager 605 that supports resolving decodability for subsequent transmissions in accordance with aspects of the present disclosure. The communications manager 605 may be an example of aspects of a communications manager 415, a communications manager 515, or a communications manager 710 described herein. The communications manager 605 may include a TB receiver 610, a decoder 615, a feedback component 620, a subsequent transmission receiver 625, and a subsequent transmission decoder 630. Each of these modules may communicate, directly or indirectly, with one another (e.g., via one or more buses).

The TB receiver 610 may receive, from a base station, a transmission including a TB.

The decoder 615 may attempt to decode the transmission.

The feedback component 620 may transmit a feedback message to the base station indicating that at least a portion of the transmission including the TB was unsuccessfully decoded.

The subsequent transmission receiver 625 may receive, from the base station, one or more subsequent transmissions of at least the TB and may process one or more subsequent transmissions of at least the TB according to a decodability condition. In some cases, the subsequent transmission of the one or more subsequent transmissions is a last-received subsequent transmission.

The subsequent transmission decoder 630 may determine an effective UE throughput of the one or more subsequent transmissions of at least the TB based on scaling an initial UE throughput based on a function which is dependent at least upon a duration of a PDSCH for the TB and a number of OFDM symbols of the one or more subsequent transmissions of at least the TB. Additionally, the subsequent transmission decoder 630 may process (e.g., determine whether to attempt to decode) a subsequent transmission of the one or more subsequent transmissions based on whether an effective UE throughput of the one or more subsequent transmissions exceeds a predetermined decoding throughput threshold.

In some examples, the subsequent transmission decoder 630 may decode the subsequent transmission based on the effective UE throughput of the one or more subsequent transmissions being less than the predetermined decoding throughput threshold. Additionally or alternatively, the subsequent transmission decoder 630 may refrain from decoding the subsequent transmission based on the effective UE throughput of the one or more subsequent transmissions exceeding the predetermined decoding throughput threshold. In some cases, the subsequent transmission decoder 630 may refrain from decoding any of the one or more subsequent transmissions based on the effective UE throughput of the one or more subsequent transmissions exceeding the predetermined decoding throughput threshold. In some cases, the subsequent transmission decoder 630 may refrain from decoding the TB of the one or more subsequent transmissions based on the effective UE throughput of the one or more subsequent transmissions exceeding the predetermined decoding throughput threshold.

In some cases, the predetermined decoding throughput threshold may be based on a throughput for decoding a TB of a maximum TB size transmitted in a fourteen-symbol duration. Additionally, the predetermined decoding throughput threshold may be based on a maximum TB size, a number of codeblocks for transmitting a TB of a maximum TB size, a length of a codeblock-level CRC, a length of a TB-level CRC, a coding rate for transmitting a TB of maximum TB size with LBRM enabled, and a scaling factor. For example, the predetermined decoding throughput threshold may be defined as $$TP_{max} = f \cdot \frac{1}{R_{LBRM}} \frac{TBS_{max} + C_{max} \cdot L_{CB,CRC} + L_{TB,CRC}}{14},$$

where f is a fixed scaling factor, $C_{max}$ is a number of codeblocks required to transmit a TB of maximum TB size, $L_{CB,CRC}$ is the length of the codeblock-level CRC, $L_{TB,CRC}$ is the length of the TB-level CRC, and $R_{LBRM}$ is a coding rate when transmitting a TB of maximum TB size with LBRM enabled. In some cases, f may be one. Additionally or alternatively, f may be greater than one.

In some cases, the effective UE throughput of the one or more subsequent transmissions may further be based on a sub-carrier spacing of the subsequent transmission and a minimum sub-carrier spacing of a component carrier carrying the one or more subsequent transmissions. Additionally, the effective UE throughput of the one or more subsequent transmissions is further based on a sum of UE throughputs for multiple TBs in the one or more subsequent transmissions. For example, the effective UE throughput of the subsequent transmission may be defined as $$2^{\mu-\mu_0} \cdot \sum_{i \in S} \frac{C'_i \cdot N_{cb,i}}{L_i},$$

where $\mu$ relates to an SCS for the one or more subsequent transmissions such that SCS=b $15 \cdot 2^{\mu}$, $\mu_0$ relates to a minimum SCS configured for a component carrier, C' is a number of transmitted codeblocks in the TB, $N_{cb}$ is a circular buffer size, L is a PDSCH duration for the one or more subsequent transmissions, and S is a set of TBs scheduled in a fourteen-consecutive-symbol duration. Additionally or alternatively, the effective UE throughput of the subsequent transmission may be defined as $$2^{\mu-\mu_0} \cdot \sum_{i \in S} \frac{C'_i \cdot N_{cb,i}}{14},$$

where $\mu$ relates to an SCS for the one or more subsequent transmissions such that SCS=$15 \cdot 2^{\mu}$, $\mu_0$ relates to a minimum SCS configured for a component carrier, C' is a number of transmitted codeblocks in the TB, $N_{cb}$ is a circular buffer size, and S is a set of TBs scheduled in a fourteen-consecutive-symbol duration.

In some cases, the effective UE throughput of the one or more subsequent transmissions is based on a number of transmitted codeblocks in the TB, a circular buffer size, and a PDSCH duration for the one or more subsequent transmissions. For example, the effective UE throughput of the subsequent transmission may be defined as $$\frac{C' \cdot N_{cb}}{L},$$

where C' is a number of transmitted codeblocks in the TB, $N_{cb}$ is a circular buffer size, and L is a PDSCH duration for the subsequent transmission. Accordingly, the effective UE throughput of the subsequent transmission may be applicable for a subsequent transmission whose PDSCH duration is greater than a mini-slot duration but is not applicable for subsequent transmissions involving different SCS values or back-to-back subsequent transmissions whose PDSCH durations are of a mini-slot.

In some cases, the effective UE throughput of the subsequent transmission may be applicable for a subsequent transmission whose PDSCH duration is greater than a mini-slot duration and is applicable for a subsequent transmission involving different SCS values than the transmission including the TB. For example, the effective UE throughput of the subsequent transmission may be defined as $$2^{\mu-\mu_0} \cdot \frac{C' \cdot N_{cb}}{L},$$

where $\mu$ relates to an SCS for the subsequent transmission such that SCS=$15 \cdot 2^{\mu}$, $\mu_0$ relates to a minimum SCS configured for a component carrier, C' is a number of transmitted codeblocks in the TB, $N_{cb}$ is a circular buffer size, and L is a PDSCH duration for the subsequent transmission.

In some cases, $TP_{max}$ may be defined as $$TP_{max} = \frac{1}{R_{LBRM}} \frac{TBS_{LBRM}}{14},$$

where $TBS_{LBRM}$ is a maximum TB size with LBRM enabled and $R_{LBRM}$ is a coding rate when transmitting a TB of the maximum TB size with LBRM enabled. For example, the length of PDSCH durations may vary from TB to TB, resulting in the above defined $TP_{max}$. Additionally, the effective UE throughput (e.g., initial UE throughput) of the subsequent transmission may be defined as $$2^{max(0,\mu-\mu')} \cdot \sum_{i \in S} \left\lfloor \frac{C'_i}{L_i} \right\rfloor \cdot F_i,$$

where $\mu$ relates to an SCS for the one or more subsequent transmissions for an active BWP, $\mu'$ if corresponds to an SCS of a BWP across all configured BWPs of a carrier that has a largest configured number of PRBs, $C'_i$ is a number of scheduled codeblocks for an $i^{th}$ TB, $L_i$ is a PDSCH duration for the $i^{th}$ TB, S is a set of TBs scheduled partially or fully in a consecutive-symbol duration for the $i^{th}$ TB, and $F_i$ is a number of coded bits in a codeblock and is a maximum value of a min($k_{0,i}^j + E_i^j$, $N_{cb,i}$), where $k_{0,i}^j$ is a starting location of a redundancy value for a jth transmission, $E_i^j$ is a min($E_r$) of scheduled code blocks for the jth transmission, $N_{cb,i}$ is a circular buffer length, where j ranges from 0 to J−1, where J−1 is a current subsequent transmission for the $i^{th}$ TB. Additionally, the effective UE throughput of the subsequent transmission may be evaluated for an interval ending at an end of a last symbol of a latest PDSCH transmission. Additionally, $$\left\lfloor \frac{C_i'}{L_i} \right\rfloor$$

may represent a floor function for the real number calculated by $$\frac{C_i'}{L_i}.$$

In some cases, in addition to the PDSCH durations varying, the length of the subsequent transmissions of each TB may vary. For example, $TP_{max}$ may be defined as $$TP_{max} = \frac{1}{R_{LBRM}} TBS_{LBRM},$$

where $TBS_{LBRM}$ is a maximum TB size with LBRM enabled, and where $R_{LBRM}$ is a coding rate when transmitting a TB of the maximum TB size with LBRM enabled. Additionally, the effective UE throughput of the subsequent transmission may be defined as $$2^{max(0,\mu-\mu')} \cdot \sum_{i \in S} \left\lfloor \frac{C_i'}{L_i} \right\rfloor \cdot x_i F_i \text{ or } 2^{max(0,\mu-\mu')} \cdot \sum_{i \in S} \left\lfloor \frac{C_i'}{L_i} F_i \right\rfloor \cdot x_i,$$

where μ relates to an SCS for the one or more subsequent transmissions for an active BWP, μ' corresponds to an SCS of a BWP across all configured BWPs of a carrier that has a largest configured number of PRBs, $C_i'$ is a number of scheduled codeblocks for an $i^{th}$ TB, $L_i$ is a PDSCH duration for the $i^{th}$ TB, S is a set of TBs scheduled partially or fully in a consecutive-symbol duration for the $i^{th}$ TB, $x_i$ is a number of OFDM symbols of the one or more subsequent transmissions of the $i^{th}$ TB, and $F_i$ is a number of coded bits in a codeblock and is a maximum value of a min($k_{0,i}^j + E_i^k$, $N_{cb,i}$), where $k_{0,i}^j$ is a starting location of a redundancy value for a $j^{th}$ transmission, $E_i^j$ is a min($E_r$) of scheduled code blocks for the $j^{th}$ transmission, $N_{cb,i}$ is a circular buffer length, where j ranges from 0 to J−1, where J−1 is a current subsequent transmission for the $i^{th}$ TB. Based on these equations, the effective UE throughput (e.g., initial UE throughput, $$2^{max(0,\mu-\mu')} \cdot \sum_{i \in S} \left\lfloor \frac{C_i'}{L_i} \right\rfloor \cdot F_i)$$

may be scaled based on the ratio between $x_i$ (e.g., the number of OFDM symbols that the subsequent transmission of the $i^{th}$ TB uses) and $L_i$ (e.g., the total number of OFDM symbols allocated to a PDSCH for the subsequent transmission of the $i^{th}$ TB). Additionally, the effective UE throughput of the subsequent transmission may be evaluated for an interval ending at an end of a last symbol of a latest PDSCH transmission. Additionally $$\left\lfloor \frac{C_{i'}}{L_i} \right\rfloor \text{ and } \left\lfloor \frac{C_{i'}}{L_i} F_i \right\rfloor$$

may represent floor functions as described above for the real number inputs calculated by $$\frac{C_{i'}}{L_i} \text{ and } \frac{C_{i'}}{L_i} F_i,$$

respectively.

In some cases, the length of the active BWP may not be fixed at a set length (e.g., 14 OFDM symbols), which may affect $TP_{max}$ and the effective UE throughput of the subsequent transmission. For example, $TP_{max}$ may be defined as $$TP_{max} = \frac{1}{R_{LBRM}} \frac{TBS_{LBRM} \cdot \text{window length}}{14},$$

where $TBS_{LBRM}$ is a maximum TB size with LBRM enabled, the window length is a predefined number of consecutive symbols, and where $R_{LBRM}$ is a coding rate when transmitting a TB of the maximum TB size with LBRM enabled. Additionally, the effective UE throughput of the subsequent transmission may be defined as $2^{max(0,\mu-\mu')} \cdot \Sigma_{i \in S} C_i' \cdot F_i$, where μ relates to an SCS for the one or more subsequent transmissions for an active BWP, μ corresponds to an SCS of a BWP across all configured BWPs of a carrier that has a largest configured number of PRBs, $C_i'$ is a number of scheduled codeblocks for an $i^{th}$ TB, S is a set of TBs scheduled partially or fully in a consecutive-symbol duration for the $i^{th}$ TB, and $F_i$ is a number of coded bits in a codeblock and is a maximum value of a min($k_{0,i}^j + E_i^j$, $N_{cb,i}$), where $k_{0,i}^j$ is a starting location of a redundancy value for a $j^{th}$ transmission, $E_i^j$ is a min($E_r$) of scheduled code blocks for the $j^{th}$ transmission, $N_{cb,i}$ is a circular buffer length, where j ranges from 0 to J−1, where J−1 is a current subsequent transmission for the $i^{th}$ TB. Additionally, the effective UE throughput of the subsequent transmission may be evaluated at an end of a TB.

In some cases, the effective UE throughput of the one or more subsequent transmissions may be applicable for subsequent transmissions that are not using redundancy version zero, where the redundancy version zero indicates the subsequent transmissions begin at a bit zero of an encoded information message. Additionally or alternatively, the effective UE throughput of the one or more subsequent transmissions may be applicable regardless of a redundancy version used by the one or more subsequent transmissions, where the redundancy version indicates a location in an encoded information message where the one or more subsequent transmissions begin.

Figure 7:
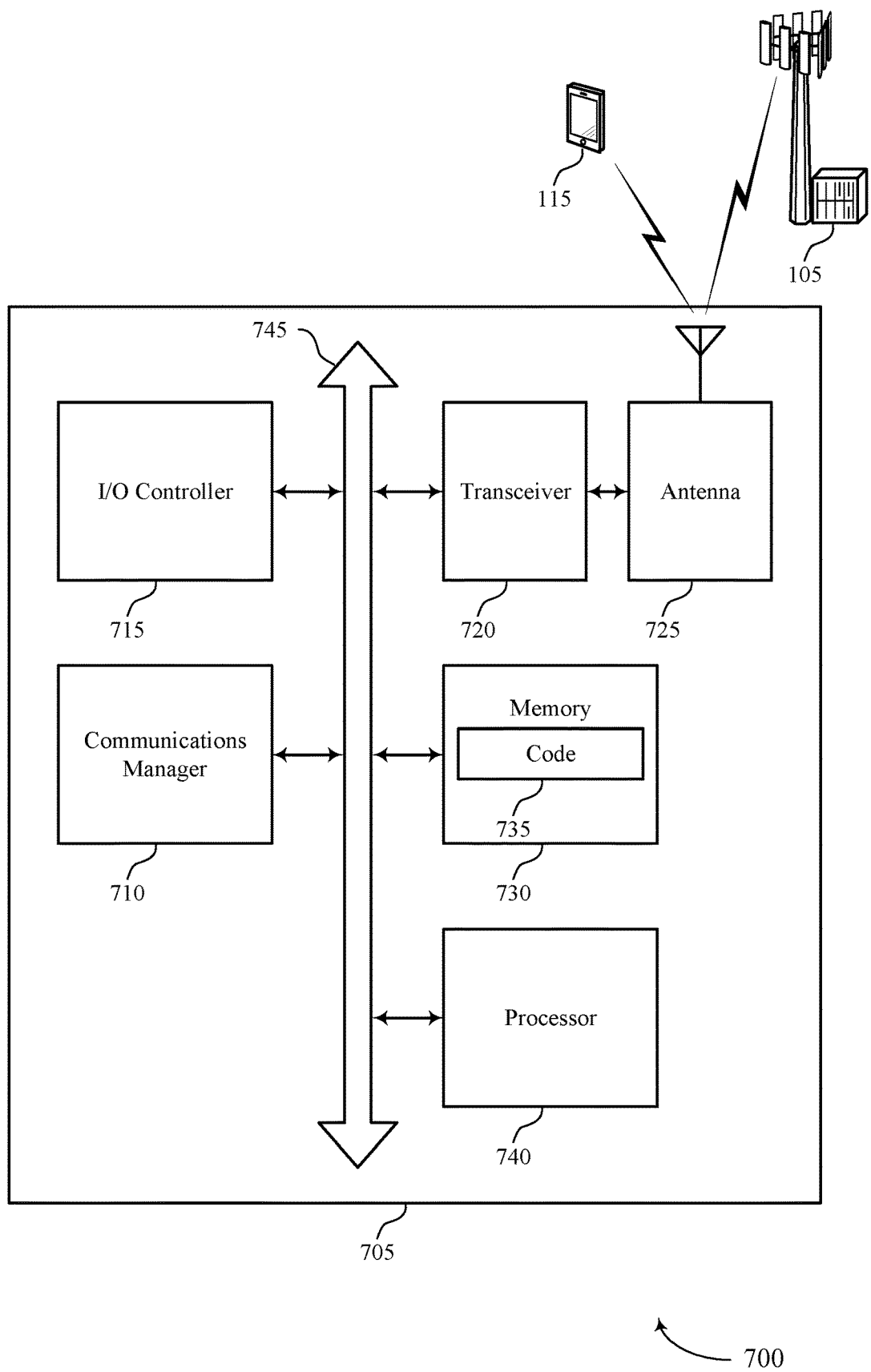
FIG. 7 shows a diagram of a system including a device that supports resolving decodability for subsequent transmissions in accordance with aspects of the present disclosure.

FIG. 7 shows a diagram of a system 700 including a device 705 that supports resolving decodability for subsequent transmissions in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, a transmission including a TB, attempt to decode the transmission, transmit a feedback message to the base station indicating that at least a portion of the transmission including the TB was unsuccessfully decoded, receive, from the base station, one or more subsequent transmissions of at least the TB, and process the subsequent transmissions of at least the TB. In some cases, the communications manager 710 may determine an effective UE throughput of the one or more subsequent transmissions of at least the TB based on scaling an initial UE throughput based on a function which is dependent at least upon a duration of a PDSCH for the TB and a number of OFDM symbols of the one or more subsequent transmissions of at least the TB. Additionally, the communications manager 710 may process (e.g., determine whether to attempt to decode) a subsequent transmission of the one or more subsequent transmissions based on whether the effective UE throughput of the one or more subsequent transmissions exceeds a predetermined decoding throughput threshold.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting resolving decodability for subsequent transmissions whose throughput exceeds a threshold).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
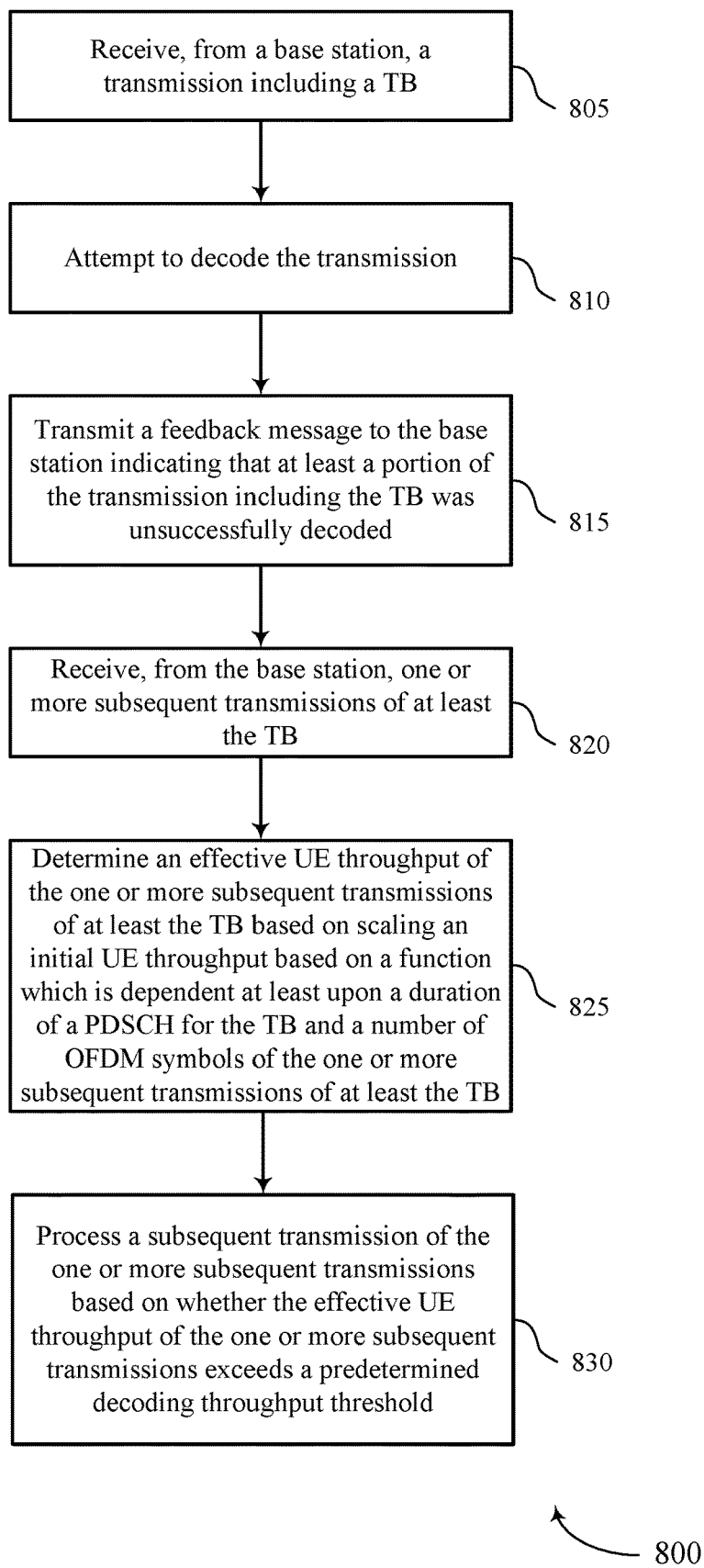
FIGS. 8 through 10 show flowcharts illustrating methods that support resolving decodability for subsequent transmissions in accordance with aspects of the present disclosure.

FIG. 8 shows a flowchart illustrating a method 800 that supports resolving decodability for subsequent transmissions in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may receive, from a base station, a transmission including a TB. The operations of 805 may be performed according to the methods described herein. In some examples, aspects of the operations of 805 may be performed by a TB receiver as described with reference to FIGS. 4 through 7.

At 810, the UE may attempt to decode the transmission. The operations of 810 may be performed according to the methods described herein. In some examples, aspects of the operations of 810 may be performed by a decoder as described with reference to FIGS. 4 through 7.

At 815, the UE may transmit a feedback message to the base station indicating that at least a portion of the transmission including the TB was unsuccessfully decoded. The operations of 815 may be performed according to the methods described herein. In some examples, aspects of the operations of 815 may be performed by a feedback component as described with reference to FIGS. 4 through 7.

At 820, the UE may receive, from the base station, one or more subsequent transmissions of at least the TB. The operations of 820 may be performed according to the methods described herein. In some examples, aspects of the operations of 820 may be performed by a subsequent transmission receiver as described with reference to FIGS. 4 through 7.

At 825, the UE may determine an effective UE throughput of the one or more subsequent transmissions of at least the TB based on scaling an initial UE throughput based on a function which is dependent at least upon a duration of a PDSCH for the TB and a number of OFDM symbols of the one or more subsequent transmissions of at least the TB. The operations of 825 may be performed according to the methods described herein. In some examples, aspects of the operations of 825 may be performed by a subsequent transmission decoder as described with reference to FIGS. 4 through 7.

At 830, the UE may process a subsequent transmission of the one or more subsequent transmissions based on whether the effective UE throughput of the one or more subsequent transmissions exceeds a predetermined decoding throughput threshold. The operations of 830 may be performed according to the methods described herein. In some examples, aspects of the operations of 830 may be performed by a subsequent transmission decoder as described with reference to FIGS. 4 through 7.

Figure 9:
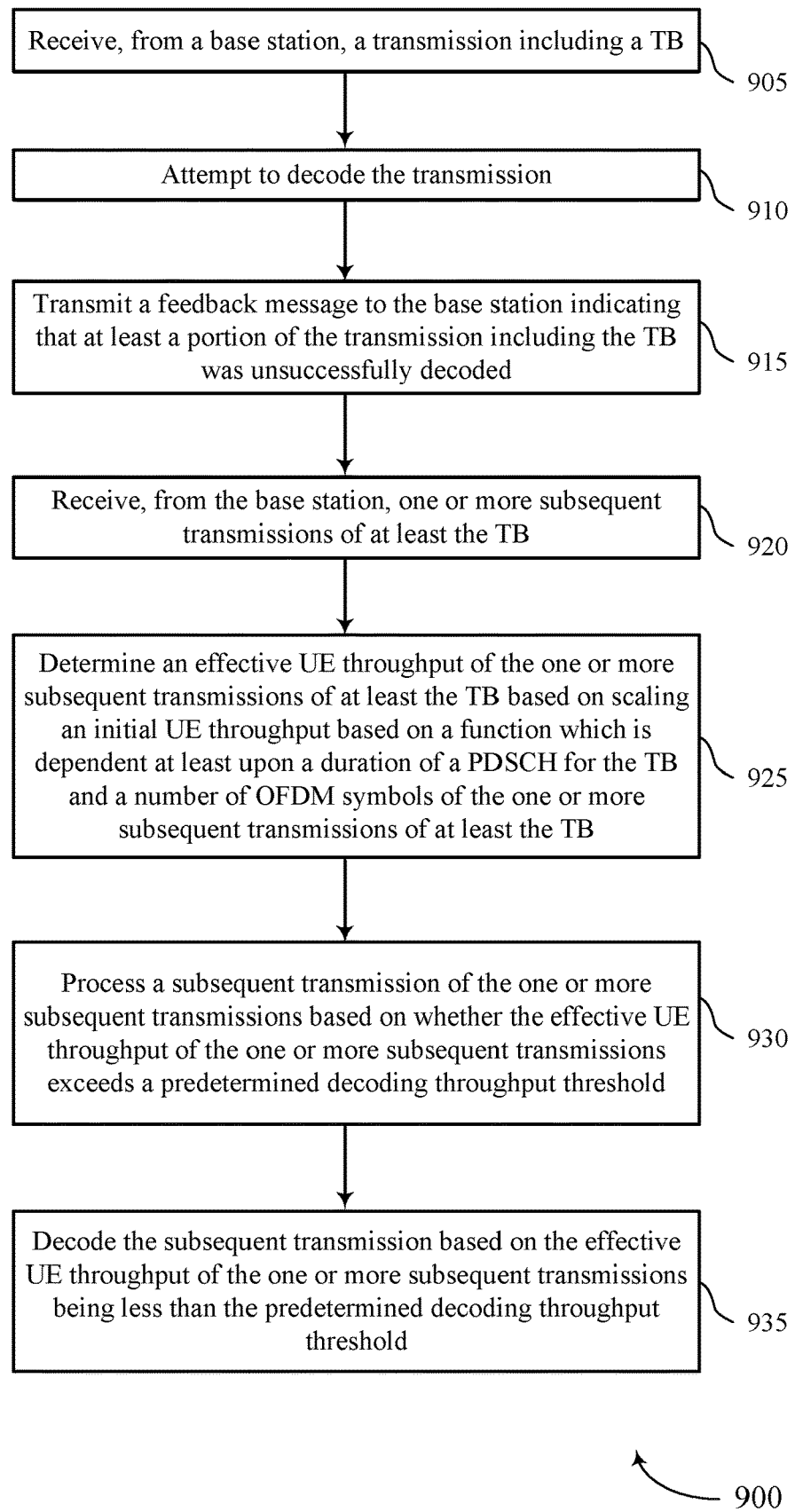

FIG. 9 shows a flowchart illustrating a method 900 that supports resolving decodability for subsequent transmissions in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may receive, from a base station, a transmission including a TB. The operations of 905 may be performed according to the methods described herein. In some examples, aspects of the operations of 905 may be performed by a TB receiver as described with reference to FIGS. 4 through 7.

At 910, the UE may attempt to decode the transmission. The operations of 910 may be performed according to the methods described herein. In some examples, aspects of the operations of 910 may be performed by a decoder as described with reference to FIGS. 4 through 7.

At 915, the UE may transmit a feedback message to the base station indicating that at least a portion of the transmission including the TB was unsuccessfully decoded. The operations of 915 may be performed according to the methods described herein. In some examples, aspects of the operations of 915 may be performed by a feedback component as described with reference to FIGS. 4 through 7.

At 920, the UE may receive, from the base station, one or more subsequent transmissions of at least the TB. The operations of 920 may be performed according to the methods described herein. In some examples, aspects of the operations of 920 may be performed by a subsequent transmission receiver as described with reference to FIGS. 4 through 7.

At 925, the UE may determine an effective UE throughput of the one or more subsequent transmissions of at least the TB based on scaling an initial UE throughput based on a function which is dependent at least upon a duration of a PDSCH for the TB and a number of OFDM symbols of the one or more subsequent transmissions of at least the TB. The operations of 925 may be performed according to the methods described herein. In some examples, aspects of the operations of 925 may be performed by a subsequent transmission decoder as described with reference to FIGS. 4 through 7.

At 930, the UE may process a subsequent transmission of the one or more subsequent transmissions based on whether the effective UE throughput of the one or more subsequent transmissions exceeds a predetermined decoding throughput threshold. The operations of 930 may be performed according to the methods described herein. In some examples, aspects of the operations of 930 may be performed by a subsequent transmission decoder as described with reference to FIGS. 4 through 7.

At 935, as an example when processing the subsequent transmission of the one or more subsequent transmissions, the UE may decode the subsequent transmission based on the effective UE throughput of the one or more subsequent transmissions being less than the predetermined decoding throughput threshold. The operations of 935 may be performed according to the methods described herein. In some examples, aspects of the operations of 935 may be performed by a subsequent transmission decoder as described with reference to FIGS. 4 through 7.

Figure 10:
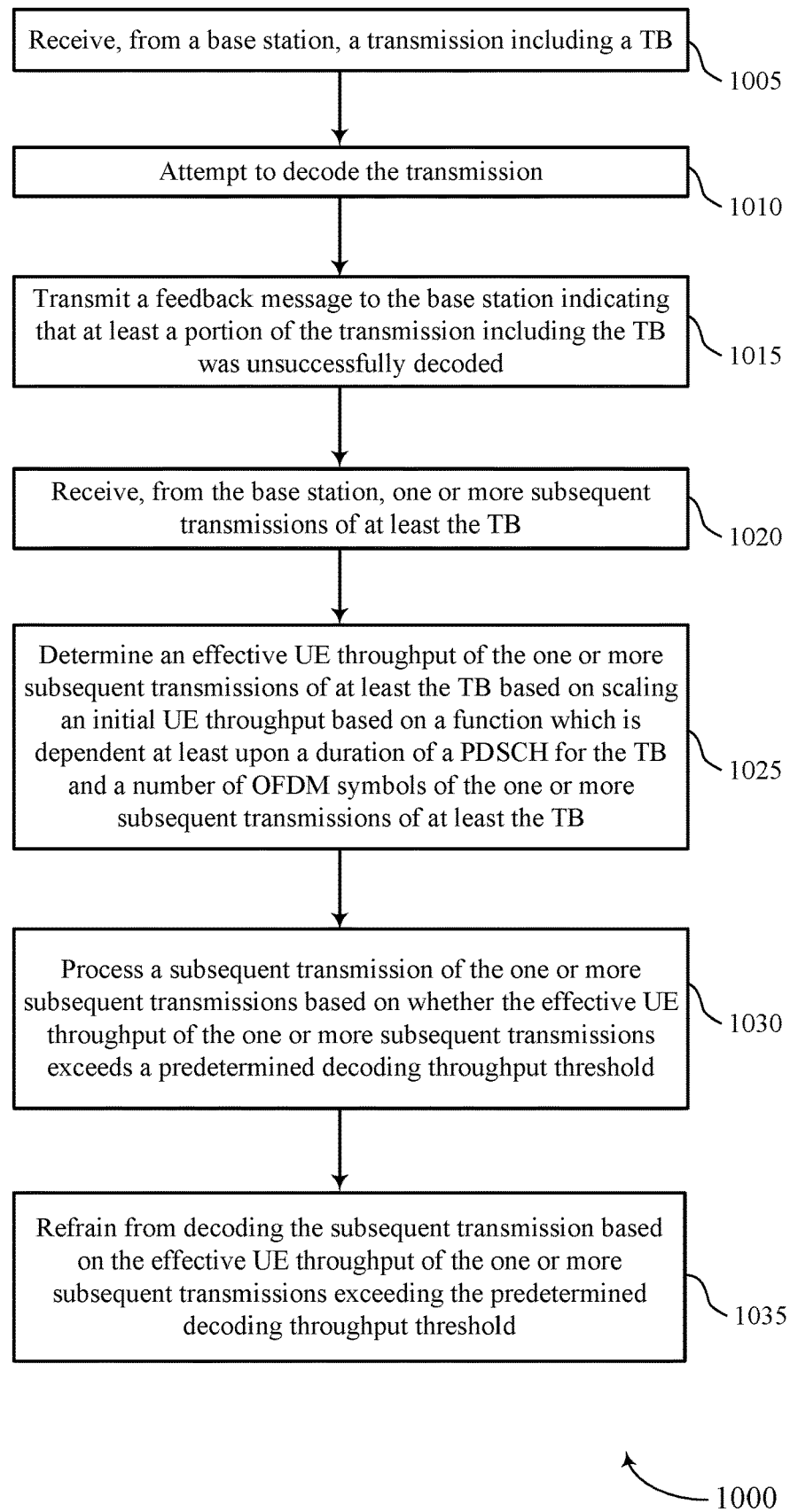

FIG. 10 shows a flowchart illustrating a method 1000 that supports resolving decodability for subsequent transmissions whose throughput exceeds a threshold in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may receive, from a base station, a transmission including a TB. The operations of 1005 may be performed according to the methods described herein. In some examples, aspects of the operations of 1005 may be performed by a TB receiver as described with reference to FIGS. 4 through 7.

At 1010, the UE may attempt to decode the transmission. The operations of 1010 may be performed according to the methods described herein. In some examples, aspects of the operations of 1010 may be performed by a decoder as described with reference to FIGS. 4 through 7.

At 1015, the UE may transmit a feedback message to the base station indicating that at least a portion of the transmission including the TB was unsuccessfully decoded. The operations of 1015 may be performed according to the methods described herein. In some examples, aspects of the operations of 1015 may be performed by a feedback component as described with reference to FIGS. 4 through 7.

At 1020, the UE may receive, from the base station, one or more subsequent transmissions of at least the TB. The operations of 1020 may be performed according to the methods described herein. In some examples, aspects of the operations of 1020 may be performed by a subsequent transmission receiver as described with reference to FIGS. 4 through 7.

At 1025, the UE may determine an effective UE throughput of the one or more subsequent transmissions of at least the TB based on scaling an initial UE throughput based on a function which is dependent at least upon a duration of a PDSCH for the TB and a number of OFDM symbols of the one or more subsequent transmissions of at least the TB. The operations of 1025 may be performed according to the methods described herein. In some examples, aspects of the operations of 1025 may be performed by a subsequent transmission decoder as described with reference to FIGS. 4 through 7.

At 1030, the UE may process a subsequent transmission of the one or more subsequent transmissions based on whether the effective UE throughput of the one or more subsequent transmissions exceeds a predetermined decoding throughput threshold. The operations of 1030 may be performed according to the methods described herein. In some examples, aspects of the operations of 1030 may be performed by a subsequent transmission decoder as described with reference to FIGS. 4 through 7.

At 1035, as an example when processing the subsequent transmission of the one or more subsequent transmissions, the UE may refrain from decoding the subsequent transmission based on the effective UE throughput of the one or more subsequent transmissions exceeding the predetermined decoding throughput threshold. The operations of 1035 may be performed according to the methods described herein. In some examples, aspects of the operations of 1035 may be performed by a subsequent transmission decoder as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

The following provides an overview of further examples of the present invention:

Example 1: A method for wireless communication at a UE, comprising: receiving, from a base station, a transmission including a TB; attempting to decode the transmission; transmitting a feedback message to the base station indicating that at least a portion of the transmission including the TB was unsuccessfully decoded; receiving, from the base station, one or more subsequent transmissions of at least the TB; determining an effective UE throughput of the one or more subsequent transmissions of at least the TB based at least in part on scaling an initial UE throughput based on a function which is dependent at least upon a duration of a physical downlink shared channel for the TB and a number of orthogonal frequency division multiplexing (OFDM) symbols of the one or more subsequent transmissions of at least the TB; and processing a subsequent transmission of the one or more subsequent transmissions based at least in part on whether the effective UE throughput of the one or more subsequent transmissions exceeds a predetermined decoding throughput threshold.

Example 2: The method of example 1, wherein processing the subsequent transmission of the one or more subsequent transmissions comprises: decoding the subsequent transmission based on the effective UE throughput of the one or more subsequent transmissions being less than the predetermined decoding throughput threshold.

Example 3: The method of example 1, wherein processing the subsequent transmission of the one or more subsequent transmissions comprises: refraining from decoding the subsequent transmission based on the effective UE throughput of the one or more subsequent transmissions exceeding the predetermined decoding throughput threshold.

Example 3a: The method of example 1, wherein processing the subsequent transmission of the one or more subsequent transmissions comprises: refraining from decoding any of the one or more subsequent transmissions based on the effective UE throughput of the one or more subsequent transmissions exceeding the predetermined decoding throughput threshold.

Example 3b: The method of example 1, wherein processing the subsequent transmission of the one or more subsequent transmissions comprises: refraining from decoding the TB of the one or more subsequent transmissions based on the effective UE throughput of the one or more subsequent transmissions exceeding the predetermined decoding throughput threshold.

Example 4: The method of any of examples 1 to 3b, wherein the effective UE throughput of the subsequent transmission is evaluated for an interval ending at an end of a last symbol of a latest PDSCH transmission.

Example 5: The method of any of examples 1 to 4, wherein the predetermined decoding throughput threshold ($TP_{max}$) is defined as:

$$TP_{max} = \frac{1}{R_{LBRM}} TBS_{LBRM},$$

where $TBS_{LBRM}$ is a maximum TB size with limited buffer rate matching (LBRM) enabled, and where $R_{LBRM}$ is a coding rate when transmitting a TB of the maximum TB size with LBRM enabled.

Example 6: The method of example 5, wherein the effective UE throughput of the subsequent transmission is defined as:

$$2^{max(0,\mu-\mu')} \cdot \sum_{i \in S} \left\lfloor \frac{C'_i}{L_i} \right\rfloor \cdot x_i F_i,$$

where μ relates to a sub-carrier spacing (SCS) for the one or more subsequent transmissions for an active bandwidth part, μ' corresponds to an SCS of a bandwidth part across all configured bandwidth parts of a carrier that has a largest configured number of physical resource blocks, $C_{i'}$ is a number of scheduled codeblocks for an $i^{th}$ TB, $L_i$ is a physical downlink shared channel (PDSCH) duration for the $i^{th}$ TB, S is a set of TBs scheduled partially or fully in a consecutive-symbol duration for the $i^{th}$ TB, $x_i$ is a number of orthogonal frequency division multiplexing (OFDM) symbols of the one or more subsequent transmissions of the $i^{th}$ TB, $F_i$ is a number of coded bits in a codeblock and is a maximum value of a $\min(k_{0,i}{}^j + E_i{}^j, N_{cb,i})$, where $k_{0,i}{}^j$ is a starting location of a redundancy value for a $j^{th}$ transmission, $E_i{}^k$ is a $\min(E_r)$ of scheduled code blocks for the $j^{th}$ transmission, $N_{cb,i}$ is a circular buffer length, where j ranges from 0 to J−1, where J−1 is a current subsequent transmission for the $i^{th}$ TB, $$\left\lfloor \frac{C_{i'}}{L_i} \right\rfloor$$

is a floor function for the input $$\frac{C_{i'}}{L_i}, \text{ and } 2^{\max(0,\mu-\mu')} \cdot \sum_{i \in S} \left\lfloor \frac{C_{i'}}{L_i} \right\rfloor \cdot F_i$$

of represents the initial UE throughput.

Example 7: The method of any of examples 1 to 6, wherein the subsequent transmission of the one or more subsequent transmissions is a last-received subsequent transmission.

Example 8: The method of any of examples 1 to 7, wherein the predetermined decoding throughput threshold is based at least in part on a throughput for decoding a TB of a maximum TB size transmitted in a fourteen-symbol duration.

Example 9: The method of any of examples 1 to 7, wherein the predetermined decoding throughput threshold is based at least in part on a maximum TB size, a number of codeblocks for transmitting a TB of the maximum TB size, a length of a codeblock-level CRC, a length of a transport-level CRC, a coding rate for transmitting a TB of the maximum TB size with LBRM enabled, and a scaling factor.

Example 10: The method of example 9, wherein the scaling factor is one.

Example 11: The method of example 9, wherein the scaling factor is greater than one.

Example 12: The method of any of examples 1 to 11, wherein the effective UE throughput of the one or more subsequent transmissions is based at least in part on a number of transmitted codeblocks in the TB, a circular buffer size, and a physical downlink shared channel (PDSCH) duration for the one or more subsequent transmissions.

Example 13: The method of example 12, wherein the effective UE throughput of the subsequent transmission is applicable for a subsequent transmission whose PDSCH duration is greater than a mini-slot duration but is not applicable for subsequent transmissions involving different sub-carrier spacing values or back-to-back subsequent transmissions whose PDSCH durations are of a mini-slot.

Example 14: The method of example 12, wherein the effective UE throughput of the one or more subsequent transmissions is further based on a sub-carrier spacing of the subsequent transmission and a minimum sub-carrier spacing of a component carrier carrying the one or more subsequent transmissions.

Example 15: The method of example 14, wherein the effective UE throughput of the subsequent transmission is applicable for a subsequent transmission whose PDSCH duration is greater than a mini-slot duration and is applicable for a subsequent transmission involving different sub-carrier spacing values than the transmission including the TB.

Example 16: The method of example 14, wherein the effective UE throughput of the one or more subsequent transmissions is further based on a sum of UE throughputs for multiple TBs in the one or more subsequent transmissions.

Example 17: The method of example 16, wherein the effective UE throughput of the one or more subsequent transmissions is applicable for subsequent transmissions that are not using redundancy version zero, the redundancy version zero indicating the subsequent transmissions begin at a bit zero of an encoded information message.

Example 18: The method of example 16, wherein the effective UE throughput of the one or more subsequent transmissions is applicable regardless of a redundancy version used by the one or more subsequent transmissions, the redundancy version indicating a location in an encoded information message where the one or more subsequent transmissions begin.

Example 19: The method of any of examples 1 to 18, wherein processing the subsequent transmission of the one or more subsequent transmissions comprises determining whether to require the UE to decode at least one or more of the one or more subsequent transmissions.

Example 20: The method of any of example 19, wherein determining whether to require the UE to decode the subsequent transmission of the one or more subsequent transmissions is based at least in part on whether an effective UE throughput of the at least one or more of the one or more subsequent transmissions exceeds the predetermined decoding throughput threshold.

Example 21: An apparatus comprising at least one means for performing a method of any of examples 1 to 20.

Example 22: An apparatus for wireless communications comprising a processor; memory in electronic communication with the processor; and instructions stored in the memory and executable by the processor to cause the apparatus to perform a method of any of examples 1 to 20.

Example 23: A non-transitory computer-readable medium storing code for wireless communications, the code comprising instructions executable by a processor to perform a method of any of examples 1 to 20.

What is claimed is:
1. A method for wireless communication at a user equipment (UE), comprising:
receiving, from a base station, a transmission including a transport block (TB);
attempting to decode the transmission;
transmitting a feedback message to the base station indicating that at least a portion of the transmission including the TB was unsuccessfully decoded;
receiving, from the base station, one or more subsequent transmissions including at least a retransmission of the TB;

determining an effective UE throughput as:

$$2^{\max(0,\mu-\mu')} \cdot \sum_{i \in S} \left\lfloor \frac{C'_i}{L_i} \right\rfloor x_i F_i,$$

where μ relates to a sub-carrier spacing (SCS) for the one or more subsequent transmissions for an active bandwidth part, μ' corresponds to an SCS of a bandwidth part across all configured bandwidth parts of a carrier that has a largest configured number of physical resource blocks, S is a set of TBs scheduled partially or fully in a fourteen consecutive symbol duration, $C'_i$ ; is a number of scheduled codeblocks for an $i^{th}$ TB, $L_i$ is a physical downlink shared channel (PDSCH) duration for the $i^{th}$ TB, $x_i$ is a number of orthogonal frequency division multiplexing (OFDM) symbols used for transmission of the $i^{th}$ TB, $F_i$ is a maximum value of a $\min(k^j_{o,i}+E^j_i, N_{ch,i})$, where $k^j_{o,i}$ is a starting location of a redundancy value for a $j^{th}$ transmission, $E^j_i$ is a $\min(E_r)$ of scheduled code blocks for the $j^{th}$ transmission, $N_{ch,i}$ is a circular buffer length, where j ranges from 0 to J−1,which is a current transmission for the $i^{th}$ TB, and ⌊ ⌋ is a floor function for the input of ⌊ ⌋ wherein the effective UE throughput is evaluated ending at a last symbol of a latest occurring PDSCH transmission; and processing a subsequent transmission of the one or more subsequent transmissions based at least in part on whether the effective UE throughput exceeds a predetermined decoding throughput threshold.

2. The method of claim 1, wherein processing the subsequent transmission of the one or more subsequent transmissions comprises:
decoding the subsequent transmission based on the effective UE throughput of the one or more subsequent transmissions being less than the predetermined decoding throughput threshold.

3. The method of claim 1, wherein processing the subsequent transmission of the one or more subsequent transmissions comprises:
refraining from decoding the subsequent transmission based on the effective UE throughput of the one or more subsequent transmissions exceeding the predetermined decoding throughput threshold.

4. The method of claim 1, wherein processing the subsequent transmission of the one or more subsequent transmissions comprises:
refraining from decoding any of the one or more subsequent transmissions based on the effective UE throughput of the one or more subsequent transmissions exceeding the predetermined decoding throughput threshold.

5. The method of claim 1, wherein processing the subsequent transmission of the one or more subsequent transmissions comprises:
refraining from decoding at least one TB of the subsequent transmission based on the effective UE throughput exceeding the predetermined decoding throughput threshold.

6. The method of claim 1, wherein the predetermined decoding throughput threshold ($TP_{max}$) is defined as:

$$TP_{max} = \frac{1}{R_{LBRM}} TBS_{LBRM},$$

where $TBS_{LBRM}$ is a maximum TB size with limited buffer rate matching (LBRM) enabled, and where $R_{LBRM}$ is a coding rate when transmitting a TB of the maximum TB size with LBRM enabled.

7. The method of claim 1, wherein the subsequent transmission of the one or more subsequent transmissions is a last-received subsequent transmission.

8. The method of claim 1, wherein the predetermined decoding throughput threshold is based at least in part on a throughput for decoding a TB of a maximum TB size transmitted in a fourteen-symbol duration.

9. The method of claim 1, wherein the predetermined decoding throughput threshold is based at least in part on a maximum TB size, a number of codeblocks for transmitting a TB of the maximum TB size, a length of a codeblock-level cyclic redundancy check (CRC), a length of a transport-level CRC, a coding rate for transmitting a TB of the maximum TB size with limited-buffer rate-matching (LBRM) enabled, and a scaling factor.

10. The method of claim 9, wherein the scaling factor is one.

11. The method of claim 9, wherein the scaling factor is greater than one.

12. The method of claim 1, wherein the effective UE throughput is applicable for a subsequent transmission whose PDSCH duration is greater than a mini-slot duration but is not applicable for subsequent transmissions involving different sub-carrier spacing values or back-to-back subsequent transmissions whose PDSCH durations are of a mini-slot.

13. The method of claim 1, wherein the effective UE throughput is further based on a sub-carrier spacing of the one or more subsequent transmissions and a minimum sub-carrier spacing of a component carrier carrying the one or more subsequent transmissions.

14. The method of claim 13, wherein the effective UE throughput is applicable for a subsequent transmission whose PDSCH duration is greater than a mini-slot duration and is applicable for a subsequent transmission involving different sub-carrier spacing values than the transmission including the TB.

15. The method of claim 13, wherein the effective UE throughput is applicable for subsequent transmissions that are not using a redundancy version zero, the redundancy version zero indicating the subsequent transmissions begin at a bit zero of an encoded information message.

16. The method of claim 13, wherein the effective UE throughput is applicable regardless of a redundancy version used by the one or more subsequent transmissions, the redundancy version indicating a location in an encoded information message where the one or more subsequent transmissions begin.

17. The method of claim 1, wherein processing the subsequent transmission of the one or more subsequent transmissions comprises:
determining whether the UE is required to decode the subsequent transmission of the one or more subsequent transmissions.

18. The method of claim 17, wherein determining whether the UE is required to decode the subsequent transmission of the one or more subsequent transmissions is based at least in part on whether the effective UE throughput exceeds the predetermined decoding throughput threshold.

19. An apparatus for wireless communication at a user equipment (UE), comprising:
a processor,
memory coupled with the processor; and instructions stored in the memory and executable by the processor to cause the apparatus to:
- receive, from a base station, a transmission including a transport block (TB);
- attempt to decode the transmission;
- transmit a feedback message to the base station indicating that at least a portion of the transmission including the TB was unsuccessfully decoded;
- receive, from the base station, one or more subsequent transmissions including at least a retransmission of the TB;
- determine an effective UE throughput as:

$$2^{max(0,\mu-\mu')} \cdot \sum_{i \in S} \left\lfloor \frac{C'_i}{L_i} \right\rfloor x_i F_i,$$

where μ relates to a sub-carrier spacing (SCS) for the one or more subsequent transmissions for an active bandwidth part, μ' corresponds to an SCS of a bandwidth part across all configured bandwidth parts of a carrier that has a largest configured number of physical resource blocks, S is a set of TBs scheduled partially or fully in a fourteen consecutive symbol duration, $C'_i$ is a number of scheduled codeblocks for an $i^{th}$ TB, $L_i$ is a physical downlink shared channel (PDSCH) duration for the $i^{th}$ TB, $x_i$ is a number of orthogonal frequency division multiplexing (OFDM) symbols used for transmission of the $i^{th}$ TB, $F_i$ is a maximum value of a $min(k^j_{o,i}+E^j_i,N_{cb,i})$, where $k^j_{o,i}$ is a starting location of a redundancy value for a $j^{th}$ transmission, $E^j_i$ is a $min(E_r)$ of scheduled code blocks for the $j^{th}$ transmission, $N_{ch,i}$ is a circular buffer length, where j ranges from 0 to J−1, which is a current transmission for the $i^{th}$ TB, and ⌊⌋ is a floor function for the input of *;

wherein the effective UE throughput is evaluated ending at a last symbol of the latest occurring PDSCH transmission; and process a subsequent transmission of the one or more subsequent transmissions based at least in part on whether the effective UE throughput exceeds a predetermined decoding throughput threshold.

20. The apparatus of claim 19, wherein the instructions to process the subsequent transmission of the one or more subsequent transmissions are further executable by the processor to cause the apparatus to:
decode the subsequent transmission based on the effective UE throughput of the one or more subsequent transmissions being less than the predetermined decoding throughput threshold.

21. The apparatus of claim 19, wherein the instructions to process the subsequent transmission of the one or more subsequent transmissions are further executable by the processor to cause the apparatus to:
refrain from decoding any of the one or more subsequent transmissions based on the effective UE throughput of the one or more subsequent transmissions exceeding the predetermined decoding throughput threshold.

22. The apparatus of claim 19, wherein the predetermined decoding throughput threshold ($TP_{max}$) is defined as:

$$TP_{max} = \frac{1}{R_{LBRM}} TBS_{LBRM},$$

where $TBS_{LBRM}$ is a maximum TB size with limited buffer rate matching (LBRM) enabled, and where $R_{LBRM}$ is a coding rate when transmitting a TB of the maximum TB size with LBRM enabled.

23. An apparatus for wireless communication at a user equipment (UE), comprising:
- means for receiving, from a base station, a transmission including a transport block (TB);
- means for attempting to decode the transmission;
- means for transmitting a feedback message to the base station indicating that at least a portion of the transmission including the TB was unsuccessfully decoded;
- means for receiving, from the base station, one or more subsequent transmissions including at least a retransmission of the TB;
- means for determining an effective UE throughput as:

$$2^{max(0,\mu-\mu')} \cdot \sum_{i \in S} \left\lfloor \frac{C'_i}{L_i} \right\rfloor x_i F_i,$$

where μ relates to a sub-carrier spacing (SCS) for the one or more subsequent transmissions for an active bandwidth part, μ' corresponds to an SCS of a bandwidth part across all configured bandwidth parts of a carrier that has a largest configured number of physical resource blocks, S is a set of TBs scheduled partially or fully in a fourteen consecutive symbol duration, $C'_i$ is a number of scheduled codeblocks for an $i^{th}$ TB, $L_i$ is a physical downlink shared channel (PDSCH) duration for the $i^{th}$ TB, $x_i$ is a number of orthogonal frequency division multiplexing (OFDM) symbols used for transmission of the $i^{th}$ TB, F is a maximum value of a $min(k^j_{o,i}+E^j_i,N_{ch,i})$, where $k^j_{o,i}$ is a starting location of a redundancy value for a $j^{th}$ transmission, $E^j_i$ is a $min(E_r)$ of scheduled code blocks for the $i^{th}$ transmission, $N_{ch,j}$ is a circular buffer length, where j ranges from 0 to J−1, which is a current transmission for the $i^{th}$ TB, and ⌊⌋ is a floor function for the input of *;

wherein the effective UE throughput is evaluated ending at a last symbol of the latest occurring PDSCH transmission; and means for processing a subsequent transmission of the one or more subsequent transmissions based at least in part on whether the effective UE throughput of the one or more subsequent transmissions exceeds a predetermined decoding throughput threshold.

24. A non-transitory computer-readable medium storing code for wireless communication at a user equipment (UE), the code comprising instructions executable by a processor to:
- receive, from a base station, a transmission including a transport block (TB);
- attempt to decode the transmission;
- transmit a feedback message to the base station indicating that at least a portion of the transmission including the TB was unsuccessfully decoded;
- receive, from the base station, one or more subsequent transmissions including at least a retransmission of the TB;
- determine an effective UE throughput as:

$$2^{max(0,\mu-\mu')} \cdot \sum_{i \in S} \left\lfloor \frac{C'_i}{L_i} \right\rfloor x_i F_i,$$

where µ relates to a sub-carrier spacing (SCS) for the one or more subsequent transmissions for an active bandwidth part, µ' corresponds to an SCS of a bandwidth part across all configured bandwidth parts of a carrier that has a largest configured number of physical resource blocks, S is a set of TBs scheduled partially or fully in a fourteen consecutive symbol duration, $C'_i$ is a number of scheduled codeblocks for an $i^{th}$ TB, $L_i$ is a physical downlink shared channel (PDSCH) duration for the $i^{th}$ TB, $x_i$ is a number of orthogonal frequency division multiplexing (OFDM) symbols used for transmission of the $i^{th}$ TB, $F_i$ is a maximum value of a $\min(k^j_{o,i}+E^j_i, N_{ch,i})$, where $k^j_{o,i}$ is a starting location of a redundancy value for a $j^{th}$ transmission, $E^j_i$ is a $\min(E_r)$ of scheduled code blocks for the $j^{th}$ transmission, $N_{ch,i}$ is a circular buffer length, where j ranges from 0 to J-1, which is a current transmission for the $i^{th}$ TB, and ⌊ ⌋ is a floor function for the input of $\frac{}{}$ wherein the effective UE throughput is evaluated ending at a last symbol of the latest occurring PDSCH transmission; and process a subsequent transmission of the one or more subsequent transmissions based at least in part on whether the effective UE throughput exceeds a predetermined decoding throughput threshold.

25. The method of claim 1, wherein processing the subsequent transmission of the one or more subsequent transmissions comprises:
refraining from decoding at least one TB associated with the subsequent transmission, and
sending a NACK for the at least one TB to the base station.

26. The apparatus of claim 19, wherein the instructions to process the subsequent transmission of the one or more subsequent transmissions are further executable by the processor to cause the apparatus to:
refrain from decoding at least one TB associated with the subsequent transmission, and
send a NACK for the at least one TB to the base station.

27. The apparatus of claim 23, wherein the means for processing a subsequent transmission of the one or more subsequent transmissions are configured to:
refrain from decoding at least one TB associated with the subsequent transmission, and
send a NACK for the at least one TB to the base station.

* * * * *